United States Patent
Neff et al.

(10) Patent No.: US 7,497,812 B2
(45) Date of Patent: Mar. 3, 2009

(54) INTERACTIVE COMPUTER SIMULATION ENHANCED EXERCISE MACHINE

(75) Inventors: John D. Neff, Austin, TX (US); Matthew T. Verona, Sugar Land, TX (US); Jerry M. Roane, Austin, TX (US)

(73) Assignee: Cube X, Incorporated, Austin, TX (US)

( * ) Notice: Subject to any disclaimer, the term of this patent is extended or adjusted under 35 U.S.C. 154(b) by 0 days.

(21) Appl. No.: 11/495,229

(22) Filed: Jul. 28, 2006

(65) Prior Publication Data

US 2007/0093360 A1 Apr. 26, 2007

Related U.S. Application Data

(63) Continuation-in-part of application No. 10/950,931, filed on Sep. 25, 2004, which is a continuation-in-part of application No. 10/621,075, filed on Jul. 15, 2003, now abandoned.

(51) Int. Cl.
 *A63B 69/03* (2006.01)
 *A63B 24/00* (2006.01)

(52) U.S. Cl. ............................... 482/72; 482/51; 482/8; 73/379.01

(58) Field of Classification Search ................ 482/1–9, 482/51, 56, 72, 73, 900–902; 434/254, 247; 73/379.01, 379.06, 379.07
See application file for complete search history.

(56) References Cited

U.S. PATENT DOCUMENTS

| 3,428,311 A | 2/1969 | Mitchell |
| 3,738,649 A | 6/1973 | MIller |

(Continued)

FOREIGN PATENT DOCUMENTS

JP 06-043784 2/1994

(Continued)

OTHER PUBLICATIONS

Tacx, Products pp. 1-2, VR trainers—"Fortius", retrieved from the Internet on Dec. 5, 2006: http://www.tacx.com/producten.php?language=EN&lvlMain=16&lvlSub=55&l v lSubSub=77.

(Continued)

*Primary Examiner*—Glenn Richman
(74) *Attorney, Agent, or Firm*—Morgan & Finnegan, LLP

(57) ABSTRACT

A computer simulation enhanced exercise device is provided which engages the user by directly relating the users exercise motion in real time to a visual simulation or interactive game. The exercise device may comprise any variety of machines including, stationary bikes, rowing machines, treadmills, stepper, elliptical gliders or under desk exercise. These exercise devices are configured with sensors to measure physical movements as the user exercises and are coupled to computer hardware with modeling and virtualization software to create the system. These sensor measurements are then sent to a computer for use in the physics based modeling and real-time visual simulation. The computer simulation enhanced exercise device is further provided with features including manual and automatic adjustment of resistance levels, visualization of accurate caloric burn rates and correlation to everyday food items, and network connectivity providing for multiplayer network simulations and directed advertising.

1 Claim, 32 Drawing Sheets
(4 of 32 Drawing Sheet(s) Filed in Color)

U.S. PATENT DOCUMENTS

| | | | |
|---|---|---|---|
| 3,751,033 A | 8/1973 | Rosenthal | |
| 3,896,787 A | 7/1975 | Withers | |
| 4,019,997 A | 4/1977 | Brown, Jr. et al. | |
| 4,021,040 A | 5/1977 | Inoue | |
| 4,179,823 A | 12/1979 | Sullivan et al. | |
| 4,185,818 A | 1/1980 | Brentham | |
| 4,278,095 A | 7/1981 | Lapeyre | |
| 4,477,071 A | 10/1984 | Brown et al. | |
| 4,482,149 A | 11/1984 | Weldon | |
| 4,606,538 A | 8/1986 | Wang | |
| 4,632,386 A | 12/1986 | Beech | |
| 4,645,459 A | 2/1987 | Graf et al. | |
| 4,709,917 A | 12/1987 | Yang | |
| 4,711,447 A | 12/1987 | Mansfield | |
| 4,739,984 A | 4/1988 | Dranselka | |
| 4,749,183 A | 6/1988 | Cho | |
| 4,798,377 A | 1/1989 | White | |
| 4,913,423 A | 4/1990 | Farran et al. | |
| 5,001,632 A | 3/1991 | Hall-Tipping | |
| 5,029,846 A | 7/1991 | Hao | |
| 5,044,633 A | 9/1991 | Rice | |
| 5,090,694 A * | 2/1992 | Pauls et al. | 482/118 |
| 5,149,084 A | 9/1992 | Dalebout et al. | |
| 5,160,303 A | 11/1992 | Smith | |
| 5,213,555 A | 5/1993 | Hood et al. | |
| 5,240,417 A | 8/1993 | Smithson et al. | |
| 5,308,296 A | 5/1994 | Eckstein | |
| 5,314,392 A | 5/1994 | Hawkins et al. | |
| 5,372,560 A * | 12/1994 | Chang | 482/54 |
| 5,374,227 A | 12/1994 | Webb | |
| 5,462,503 A | 10/1995 | Benjamin et al. | |
| 5,466,200 A | 11/1995 | Ulrich et al. | |
| 5,478,295 A | 12/1995 | Fracchia | |
| 5,489,249 A | 2/1996 | Brewer et al. | |
| 5,495,576 A | 2/1996 | Ritchey | |
| 5,547,442 A | 8/1996 | Carballosa et al. | |
| 5,577,981 A | 11/1996 | Jarvik | |
| 5,580,249 A | 12/1996 | Jacobsen | |
| 5,584,700 A | 12/1996 | Feldman et al. | |
| 5,591,104 A | 1/1997 | Andrus et al. | |
| 5,674,165 A | 10/1997 | Cohen et al. | |
| 5,690,582 A | 11/1997 | Ulrich et al. | |
| 5,702,323 A | 12/1997 | Poulton | |
| 5,742,400 A | 4/1998 | Satoh | |
| 5,743,832 A | 4/1998 | Sands et al. | |
| 5,769,757 A | 6/1998 | Fulks | |
| 5,779,596 A | 7/1998 | Weber | |
| 5,785,630 A | 7/1998 | Bobick et al. | |
| 5,807,211 A | 9/1998 | Berryhill | |
| 5,807,212 A | 9/1998 | Nelson | |
| 5,813,947 A | 9/1998 | Densmore | |
| 5,833,575 A | 11/1998 | Holslag | |
| 5,839,990 A | 11/1998 | Virkkala | |
| 5,846,134 A | 12/1998 | Latypov | |
| 5,863,282 A | 1/1999 | Moossun | |
| 5,888,172 A | 3/1999 | Andrus et al. | |
| 5,890,995 A | 4/1999 | Bobick et al. | |
| 5,905,499 A | 5/1999 | McDowall et al. | |
| 5,931,763 A | 8/1999 | Alessandri | |
| 6,004,243 A | 12/1999 | Ewert | |
| 6,004,247 A | 12/1999 | Webber | |
| 6,042,519 A | 3/2000 | Shea | |
| 6,050,822 A | 4/2000 | Faughn | |
| 6,059,692 A | 5/2000 | Hickman | |
| 6,079,982 A | 6/2000 | Meader | |
| 6,106,297 A | 8/2000 | Pollak et al. | |
| 6,110,049 A | 8/2000 | Wilkens | |
| 6,117,050 A | 9/2000 | Mankovtiz | |
| 6,152,856 A | 11/2000 | Studor et al. | |
| 6,193,631 B1 | 2/2001 | Hickman | |
| 6,244,987 B1 | 6/2001 | Ohsuga et al. | |
| 6,244,988 B1 | 6/2001 | Delman | |
| 6,261,212 B1 | 7/2001 | Vallone et al. | |
| 6,312,363 B1 | 11/2001 | Watterson et al. | |
| 6,352,493 B1 * | 3/2002 | Davis | 482/56 |
| 6,475,115 B1 | 11/2002 | Candito et al. | |
| 6,485,395 B1 | 11/2002 | Stearns et al. | |
| 6,492,993 B1 | 12/2002 | Konopken, et al. | |
| 6,547,702 B1 | 4/2003 | Heidecke | |
| 6,563,489 B1 | 5/2003 | Latypov et al. | |
| 6,837,432 B2 | 1/2005 | Tsikos et al. | |
| 6,866,618 B2 | 3/2005 | Rusinak-Connors | |
| 6,918,860 B1 | 7/2005 | Nusbaum | |
| 6,979,284 B2 | 12/2005 | James | |
| 7,002,573 B2 | 2/2006 | Trotta et al. | |
| 7,060,006 B1 | 6/2006 | Watterson et al. | |
| 2002/0137606 A1 | 9/2002 | Willis et al. | |
| 2002/0142898 A1 | 10/2002 | Willis et al. | |
| 2002/0160883 A1 | 10/2002 | Dugan | |
| 2004/0147379 A1 | 7/2004 | Itrich, et al. | |
| 2005/0101439 A1 | 5/2005 | Berger | |
| 2006/0063645 A1 | 3/2006 | Chiang | |
| 2006/0122035 A1 | 6/2006 | Felix | |
| 2007/0123390 A1 | 5/2007 | Mathis | |

FOREIGN PATENT DOCUMENTS

| | | |
|---|---|---|
| JP | 07-213745 | 8/1995 |
| JP | 10-151223 | 6/1998 |
| JP | 11-184584 | 7/1999 |
| JP | 2000 296185 A | 10/2000 |
| JP | 2003 126291 | 5/2003 |
| JP | 2005 066185 | 3/2005 |
| TW | 220387 | 8/2003 |
| WO | WO96/36399 | 11/1996 |
| WO | WO97/05926 | 2/1997 |
| WO | WO 00/57387 | 9/2000 |
| WO | WO 2006/038815 A1 | 4/2006 |

OTHER PUBLICATIONS

Tacx, Products pp. 1-2, Cycletrainers—"Satori", retrieved from the Internet on Dec. 5, 2006: http://www.tacx.com/producten.php?language=EN&lvlMain=16&l v lSub=57&ttop=Cycletrainers.

Tacx, Products p. 1, Ergotrainers, "Flow", retrieved from the Internet on Dec. 5, 2006: http://www.tacx.com/producten.php?language=EN&l v lMain=16&lvlSub=56&ttop=Ergotrainers.

Tacx, Service & Support p. 1, "About Tacx", retrieved from the Internet on Dec. 5, 2006: http://www.tacx.com/over+tacx.php?language=EN&l v lMain=8.

Tacx, Service & Support p. 1, "Disclaimer", retrieved from the Internet on Dec. 5, 2006: http://www.tacx.com/over+tacx.php?l v lMain=9&language=EN.

Vcycling, What's Real Is Your Sweat, pp. 1-2, Virtual Reality Indoor Cycling: The Experience, "What To Expect", retrieved from the Internet on Dec. 5, 2006: htpp://www.vcycling.com/pages/experience.asp.

Vcycling, What's Real Is Your Sweat, pp. 1-2, Virtual Reality Indoor Cycling, "A New Fitness Experience for all Generations", retrieved from the Internet on Dec. 5, 2006: htpp://www.vcycling.com/pages/home.asp.

Vcycling, What's Real Is Your Sweat, pp. 1-2, Virtual Reality Indoor Cycling, "The System", retrieved from the Internet on Dec. 5, 2006: http://www.vcycling.com/pages/system.asp.

Expresso Fitness-Home of the S2 Exercise Bike: p. 1, "The Expresso Experience", retrieved from the Internet on Dec. 5, 2006: http://www.expressofitness.com.

Expresso Fitness-Home of the S2 Exercise Bike: p. 1, retrieved from the Internet on Dec. 5, 2006: http://www.expressofitness.com/products.htm.

Expresso Fitness, Home of the S2 Exercise Bike: pp. 1-2, "Services", retrieved from the Internet on Dec. 5, 2006: http://www.expressofitness.com/services.htm.

VirtuSphere, p. 1, VirtuSphere, Inc., retrieved from the Internet on Dec. 5, 2006: http://www.virtusphere.net/.

VirtuSphere, p. 1-2, "Product", retrieved from the Internet on Dec. 5, 2006: http://www.virtusphere.net/product.htm.

Expresso Fitness, Cardio systems that engage your mind: pp. 1-3, "The Expresso Experience", retrieved from the Internet on Jan. 5, 2007: http://www.expressofitness.com/products.htm;/http://www.expressofitness.com/touring.htm.

Jonathan Portez, Expresso Fitness "The Spark" Flies Mar. 16 at IHRSA 2005.

Mosseberg et al., "Test-Riding a $5,000 Indoor Bike", pp. 1-4, retrieved from the Internet on Jan. 5, 2007: http://ptech.wsj.com/archive/solution-20060201.html.

Maxim Online, pp. 1-4, "Entertainment", retrieved from the Internet on Jan. 5, 2007: http://www.maximonline.com/articles/index.aspx?a_id=7215.

Powergrid Fitness, pp. 1-2, "The Harder You Push The Faster You Go", retrieved from the Internet on Jan. 5, 2007: http://www.powergridfitness.com/howItWorks/Default.aspx.

Powergrid Fitness, pp. 1-8, Game Listings, "The Exer-station Experience", retrieved from the Internet on Jan. 5, 2007: http://www.powergridfitness.com/intensitygaming/GameListings.aspx.

Powergrid Fitness, pp. 1-3, How it Works: "Technology", retrieved from the Internet on Jan. 5, 2007: http://www.powergridfitness.com/howitworks/technology.aspx.

IFTF's Future Now, Emerging technologies and their implications for the future, pp. 1-5, "Games Get a Little Bit More Real", retrieved from the Internet on Jan. 4, 2007: http://future.iftf.org/2004/01/games_get_a_lit.html.

SFGate, pp. 1-10, "Virtual Reality exercise, Sweat's real but scenery Isn't in video-game fitness gear", retrieved from the Internet on Jan. 4, 2007: http://www.sfgate.com/cgi-bin/article.cgi?file=/chronicle/archive/2005/07/25/BUGVRDRETD1.DTL&type=business.

* cited by examiner

| 0 Deg | -90 | -180 | -270 | -360 |

| 0 Deg mouse rotation | +90 deg rotation | +180 deg rotation | +270 deg rotation | +360 deg rotation |

| 0 Deg | 90 | 180 | 270 | 360 |

Note: both mouse wheels were rotated to the specified angles to create each scene.
x-sensor controls pedaling, y-sensor controls steering (rotating handle bar, front fork and front wheel)

Caloric rate vs. Crank Rate and Mass for Cycling Exercise

```
Separator { // ROOT NODE
    // SUBGRAPH: HEADS-UP DISPLAY
    DEF CAMERASWITCH Switch {
        whichChild 0
        TransformSeparator {
            DEF CAMERATOWORLD+0 Transform {
                rotation 0 1 0  3.14159
            }
            DEF CAMERA PerspectiveCamera {
                nearDistance 0.05
                farDistance 3900
            }
        }
    }
    File {
        name "lights.iv"
    }
    File {
        name "world.iv"
    }
    Separator {
        DEF WORLDTOGLOBAL Transform {
            rotation 0.57735 0.57735 0.57735  4.18879
        }
        DEF GLOBALTOBODY Transform { }
        DEF BODYTOSTRUCTURAL Transform {
            translation 0 0 -0.8701
        }
        Separator {
            TransformSeparator {
                DEF STRUCTURALTOSTRUCTURAL2 Transform {
                    translation 0.14 0.0 0.81
                    rotation 0.57735 0.57735 0.57735 2.0944
                }
            }
            DEF STRUCTURALTOOBJECT Transform {
                translation 0.0155 0 -0.2729
                rotation 0.57735 0.57735 0.57735  2.0944
            }
            // SUBGRAPH: GAME CHARACTER MODELS
            // SUBGRAPH: VEHICLE MODEL
        }
    }
}
```

FIG. 11A

```
Separator { // ROOT NODE
    DEF CAMERASWITCH Switch {
        whichChild 0
        TransformSeparator {
            DEF CAMERATOWORLD+0 Transform {
                rotation 0 1 0  3.14159
            }
            DEF CAMERA PerspectiveCamera {
                nearDistance 0.05
                farDistance 3900
            }
        }
    }
    Separator {
        DEF WORLDTOGLOBAL Transform {
            rotation 0.57735 0.57735 0.57735  4.18879
        }
        DEF GLOBALTOBODY Transform { }
        DEF BODYTOSTRUCTURAL Transform {
            translation 0 0 -0.8701
        }
        Separator {
            TransformSeparator {
                DEF STRUCTURALTOSTRUCTURAL2 Transform {
                    translation 0.14 0.0 0.81
                    rotation 0.57735 0.57735 0.57735 2.0944
                }
            }
        }
    }
}
```

FIG. 11B

1. Propagate hand car over simulation time-step
2. Find point R along track centerline, using polygonal path algorithm)
3. Bracket point F along forward track centerline (i.e., points 4 and 5 in Figure 1)
4. Compute distance from left bracketing point (4) to point F, along ith track segment:
   - 4.1 – compute angle B from dot product of vectors r|R-4 and r|4-5
   - 4.2 – compute length c (magnitude of r|R-4)
   - 4.3 – get length b (wheelbase of hand car)
   - 4.4 – compute angle C from Law of Sines: C = SIN-1([SIN(B)/b]*c)
   - 4.5 – compute angle A: A = 180 – B – C (B and C in degrees)
   - 4.6 – compute length a from Law of Cosines:
     a = SQRT[b*b + c*c – 2*b*c*COS(A)]
   - 4.7 – compute vector from left bracketing point to F, i.e., vector r|4-F
     r|4-F = a * UNIT(r|4-5)
   - 4.8 – compute point F from vector addition (left bracketing point r|4 + r|4-F
     r|F = r|4 + r|4-F
   - 4.9 – compute rotation angle (angle_RF) from reference axis to r|F
   - 4.10 – update Global-to-Structural transform:
     SoTransform::translation -> r|R
     SoTransform::rotation -> angle_RF
1. Repeat steps 1-4

FIG. 13A

```
1.      void update(const SbTime& newTime)
2.      {
3.              double h = (newTime-time).getValue();   // Timestep
4.              double x = time.getValue();             // Current time
5.      // CYCLE CONTROL SYSTEM
6.              cycle(h);
7.              getState(y);
8.              SbVec3f oldPosition(position);
9.              derivs(x, y, dydx);
10.     // PROPAGATE STATE
11.             rk4(y, dydx, N, x, h, yout, derivs);
12.     // UPDATE STATE
13.             setState(newTime, yout);
14.             double distance = (position-oldPosition).length();
15.     // COMPUTE GLOBAL->STRUCTURAL MATRIX
16.             SbMatrix matrix1, inverse1;
17.             SbMatrix matrix2, inverse2;
18.             globalToBody->getTranslationSpaceMatrix(matrix1, inverse1);
19.             bodyToStructural->getTranslationSpaceMatrix(matrix2, inverse2);
20.             matrix1.multLeft(matrix2);              // Form Global->Structural matrix
21.             SbVec3f rr, rf, globalToStructuralPos, s;
22.             SbRotation r, so;
23.     // Compute Global->Structural position vector
24.             matrix1.getTransform(globalToStructuralPos, r, s, so);
25.             structuralPoint->translation.setValue(globalToStructuralPos);
26.             SbVec3f point1ToStructural = globalToStructuralPos-trackData[index].point; // Left bracketing point to Structural frame
        vector
27.             SbVec3f r12 = trackData[next()].point-trackData[index].point;   // Point 1 to 2 vector
28.             double length = r12.normalize()-r12.dot(point1ToStructural);    // length from structural frame origin to point 2,
        alonng r12 vector
29.             while(length < distance) {              // While length < distance traveled, increment index, add
        increments to length in loop
30.                     index = next();
31.                     r12 = trackData[next()].point-trackData[index].point;
32.                     length += r12.length();
33.             }
34.             r12.normalize();                        // End of loop, new bracketing index is known, unitize r12 vector
35.             rr = trackData[next()].point-r12*(length-distance);     // Compute position of point below Structural frame
        origin along r12 vector
36.             globalToStructuralPos = rr+trackData[index].normal*centerlineToAxle;    // Compute updated Global to Structural
        position vector
37.             for(int index2 = next(); (trackData[index2].point-rr).length() <=
38.             wheelbase; index2 = circular_bounds(index2+increment, trackData.size())) {
39.                     ;
40.             }                                       // Find upper bracketing index based on new lower index and wheelbase
        length
41.             SbVec3f rr2 = trackData[index2].point-rr;               // Compute vector from point below Structural frame origin
        to point r2
42.             r12 = trackData[index2].point-trackData[circular_bounds(index2-increment, trackData.size())].point; // Vector from point 2
        to previous point in sequence
43.             r12.normalize();                        // Unit vector from point 2 to previous point in sequence
44.             double c = rr2.length();                // Compute terms in fitting algorithm: c, C, b, B, A, Law of Sines &
        Cosines
45.             double B = acos(median(-1.0, -rr2.dot(r12)/c, 1.0));
46.             double b = wheelbase;
47.             double C = asin(sin(B)/b*c);
48.             double A = M_PI-B-C;
49.             double a = sqrt(b*b+c*c-2*b*c*cos(A));
50.             rf = trackData[index2].point-r12*a;
```

FIG. 13B

```
// Compute point F
            SbVec3f xUnit = rf+trackData[index2].normal*centerlineToAxle-
globalToStructuralPos; // Compute X unit vector along the rotated vehicle's longitudinal axis
            xUnit.normalize();
            SbVec3f zUnit = trackData[index].normal;                    // Z
unit vector is normal to the track surface
            SbVec3f yUnit = zUnit.cross(xUnit);                         // Y
completes the right-handed system
            matrix1[3][0] = globalToStructuralPos[0];                   //
Compute updated Global to Structural transformation matrix (4x4 Homogenious Coordinates)
            matrix1[3][1] = globalToStructuralPos[1];
            matrix1[3][2] = globalToStructuralPos[2];
            matrix1[0][0] = xUnit[0];
            matrix1[0][1] = xUnit[1];
            matrix1[0][2] = xUnit[2];
            matrix1[1][0] = yUnit[0];
            matrix1[1][1] = yUnit[1];
            matrix1[1][2] = yUnit[2];
            matrix1[2][0] = zUnit[0];
            matrix1[2][1] = zUnit[1];
            matrix1[2][2] = zUnit[2];
            globalToBody->setMatrix(matrix1.multLeft(inverse2));        //
Compute updated Global to Body matrix = [ Structural->Body * Global->Structural ]
     }
```

FIG. 13C

```
C:\CUBEX\MODELS\AUSTIN
C:\CUBEX\MODELS\AUSTIN\LIGHTS
C:\CUBEX\MODELS\AUTOMOBILE
C:\CUBEX\MODELS\AUTOMOBILE\RACECAR
C:\CUBEX\MODELS\AUTOMOBILE\RACECAR\ANNA
C:\CUBEX\MODELS\AUTOMOBILE\RACECAR\BRUCE
C:\CUBEX\MODELS\BIKE\
C:\CUBEX\MODELS\BIKE\MOUNTAIN\
C:\CUBEX\MODELS\BIKE\MOUNTAIN\ANNA
C:\CUBEX\MODELS\BIKE\MOUNTAIN\BRUCE
C:\CUBEX\MODELS\BOAT\
C:\CUBEX\MODELS\ROWBOAT\
C:\CUBEX\MODELS\ROWBOAT\ANNA
C:\CUBEX\MODELS\ROWBOAT\BRUCE
C:\CUBEX\MODELS\ENVIRONMENT\
C:\CUBEX\MODELS\ENVIRONMENT\DEFAULT
C:\CUBEX\MODELS\FISH\
C:\CUBEX\MODELS\HUD\
C:\CUBEX\MODELS\JACK\
C:\CUBEX\MODELS\JACK\FLOOR\
C:\CUBEX\MODELS\JACK\FLOOR\ANNA\
C:\CUBEX\MODELS\JACK\FLOOR\BRUCE\
C:\CUBEX\MODELS\LAKE\
C:\CUBEX\MODELS\LAKE\LIGHTS
C:\CUBEX\MODELS\RAILROAD\
C:\CUBEX\MODELS\RAILROAD\LIGHTS
C:\CUBEX\MODELS\RAILVEHICLE\
C:\CUBEX\MODELS\RAILVEHICLE\HANDCAR\
C:\CUBEX\MODELS\RAILVEHICLE\HANDCAR\BRUCE\
C:\CUBEX\MODELS\SKY\
C:\CUBEX\MODELS\SKY\DEFAULT\
C:\CUBEX\MODELS\SOUNDS\
```
Article I. C:\CUBEX\MODELS\STADIUM\

FIG. 14

```
1.   void update(const SbTime& newTime)
2.   {
3.          double h = (newTime-time).getValue();  // Timestep
4.          double x = time.getValue();            // Current time
5.          cycle(h);
6.          getState(y);
7.          SbVec3f oldPosition(position);
8.          SbVec3f oldVelocity(velocity);
9.          derivs(x, y, dydx);
10.         SbVec3f oldAcceleration(dydx[1], dydx[2], 0.0);
11.         double oldAngAccel = dydx[3];
12.         double oldYaw = yaw;
13.         double oldYawRate = yawRate;
14. // PROPAGATE STATE
15.         rk4(y, dydx, N, x, h, yout, derivs);
16.         setState(x+h, yout);
17.         derivs(x+h, yout, dydx);
18. // UPDATE STATE
19.         if(velocity[0] < 0.0 || velocity.length() <= 0.3 &&
20.         oldYawRate*yawRate < 0.0) {
21.                         yaw = oldYaw;
22.                         stopHere(oldPosition);
23.         }
24. }
```

FIG. 15A

```
inline void derivs(double x, double y[], double dydx[])
{
        bike->setState(x, y);
        SbVec3f ff(0.0, 0.0, 0.0), fr(0.0, 0.0, 0.0);
        bike->normalForces(ff, fr);
        if(bike->velocity[0] > 0.0) {
                ff[1] = bike->lateralForce(ff[2]*0.0044482,
                        bike->front.slipAngle*57.29577951, 0.0);
                fr[1] = bike->lateralForce(fr[2]*0.0044482,
                        bike->rear.slipAngle*57.29577951, 0.0);
        }
        fr[0] = bike->pedalTorque()/bike->rear.radius;
        if(bike->velocity[0] != 0.0) {
                double mur = bike->front.mur;
                if(variable_friction && bike->velocity.length() >
                7.3335/2.0) mur = bike->front.mur2;
                ff[0] = -SIGN(mur*ff[2], bike->velocity[0]);
                fr[0] -= SIGN(mur*fr[2], bike->velocity[0]);
        }
        double cosSteerAngle = cos(bike->steerAngle);
        double sinSteerAngle = sin(bike->steerAngle);
        double cosYaw = cos(bike->yaw);
        double sinYaw = sin(bike->yaw);
        double tbf = 0.0;
        double tbr = 0.0;
        double tar = bike->pedalTorque();
        SbVec3f drag = -bike->kd*bike->velocity.length()*bike
                ->velocity;
        dydx[1] =  y[2]*y[3]+(ff[0]*cosSteerAngle-
                        ff[1]*sinSteerAngle+fr[0]+drag[0])/bike->mass;
        dydx[2] = -
                y[1]*y[3]+(ff[0]*sinSteerAngle+ff[1]*cosSteerAngle+fr
                [1]+drag[1])/bike->mass;
        dydx[3] = (bike->lf*(ff[0]*sinSteerAngle+ff[1]*cosSteerAngle)-
                        bike->lr*fr[1])/bike->iz;
        dydx[4] = (ff[0]*bike->front.radius-tbf)/bike->front.iw;
        dydx[5] = (fr[0]*bike->rear.radius-tbr+tar)/bike->rear.iw;
        dydx[6] = y[1]*cosYaw-y[2]*sinYaw;
        dydx[7] = y[1]*sinYaw+y[2]*cosYaw;
        dydx[8] = y[3];
        dydx[9] = y[4];
        dydx[10] = y[5];
        dydx[11] = dydx[10]/3;
        dydx[12] = bike->caloricRate();
}
```

FIG. 15B

INTERACTIVE COMPUTER SIMULATION ENHANCED EXERCISE MACHINE

This is a continuation-in-part of patent application Ser. No. 10/950,931, entitled "Exercise Device For Under A Desk", filed on Sep. 25, 2004, pending, which is a continuation in part of patent application Ser. No. 10/621,075, now abandoned.

REFERENCE TO SOURCE CODE

A source code appendix, including a source code listing relating to various embodiments of the present invention, forms part of this application. Source code disclosed in appendices, exhibits or otherwise herein, including source code listings relating to various embodiments of the present invention, forms part of this application. This patent document (including the source code appendix) contains material that is subject to copyright protection. The copyright owner has no objection to the facsimile reproduction by anyone of the patent document as it appears in the Patent and Trademark Office file or records, but otherwise reserves all copyright rights whatsoever.

FIELD OF THE INVENTION

The present invention relates to an exercise machine, and, more particularly, to an interactive computer simulation enhanced exercise machine.

BACKGROUND TO THE INVENTION

Many people appreciate the need to exercise. Unfortunately, although previous exercise machines such as stationary bikes, treadmills, rowing machines and the like, may have provided adequate workouts, most users became bored with the monotonous exercise process, and stopped exercising over time. To help avoid boredom, health clubs and home users have turned to such diversionary activities as listening to music, watching television, and reading. These activities however merely attempt to distract the user from the activity or exercise in which the user is engaged.

Research has shown that people who exercise outdoors by jogging or cycling tend to exercise more regularly, primarily due to positive interaction with others and/or the environment. Simulation based exercise machines have previously been devised wherein a visual display translated the user's activity into a game or simulator displayed on a video monitor in front of the user. These systems however have been expensive and inaccessible to the vast majority of those who could benefit from their use.

The expense of previous systems was due in part to the high cost of computers, which lacked the performance to run high fidelity simulations in real-time, the exorbitant price of computerized sensors and high end physics software. Although, recent advances in computer technology coupled with lower price points on personal computer systems have enabled the average user to run high end applications, with 3D graphics and high fidelity simulation, at least the following issues have still prevented affordable virtual reality exercise machines from entering the marketplace.

First, most current exercise devices are not compact enough to fit under a desk, are not multifunctional (e.g., for multiple exercises such as cycling, rowing, dipping, etc.), do not provide for variable resistance training, and do not provide for adjustment of the gripping mechanism, including, e.g., the pedal position and rowing arm lengths.

Second, most current computer simulation enhanced exercise systems do not provide real-time sensor feeds to the simulation application because current sensors are too costly. Without real-time sensors, current systems lacked true interactive simulation functionality.

Third, current systems rely on first-generation physics models for simulations that are (1) limited by computational efficiency because first-generation physics-based simulation algorithms are not optimized for real-time applications running on PCs, and (2) are less accurate than modem algorithms, such as Pacejka's formula, for modeling tire forces.

Fourth, current systems do not manage visual modeling complexity well because they relied upon a purely functional approach (non-object oriented approach) using OpenGL directly, which is not object-oriented because it is comprised of C functions as opposed to C++ objects.

Fifth, current systems do not efficiently or accurately model moving cameras because they required complex camera updates due to the lack of model complexity management provided by a scene graph.

Sixth, current rail vehicle simulators do not properly model the vehicle due to the oversimplification of the vehicle dynamics (due to attempts to make it fast enough for real-time), and/or do not model the complex rail/track geometry accurately in a real-time environment, combined with real-time sensor inputs for propulsion updates.

Seventh, current systems do not provide the user with accurate calorie burn rates and/or a visualization of the amount of calories burned by accurately associating calories with common food items.

Eighth, current systems do not provide fully integrated multi-user environments, or other network connectivity enhancements and thus limit the amount of game interaction and restrict enhancement of the exercise experience.

Therefore, there exists a need for an interactive computer simulation enhanced exercise machine that resolves these deficiencies, including (1) a compact multifunctional under desk exercise device providing variable resistance levels, and (2) an inexpensive system to directly link the user's exercise into interactive visual simulators or games, such as emulating the outdoor exercise experience or an exercise experience in an imaginary world with interactive computer simulations using real-time sensors, physics based modeling, accurate caloric counters and visualization of the same, efficient simulation algorithms and multiplayer network simulations and games.

SUMMARY OF THE INVENTION

We have devised an inexpensive computer simulation enhanced exercise device which engages the user by directly relating the user's exercise motion in real time to a visual simulation or interactive game.

The exercise device may comprise any variety of machines including, stationary bikes, rowing machines, treadmills, stepper, elliptical gliders or under desk exercise device as disclosed in U.S. Patent Pub. No. US2005/0054492 A1 and U.S. Patent Pub. No. US2005/0014609 A1, which are incorporated herein by reference. These exercise devices are configured with sensors to measure physical movements as the user exercises and are coupled to computer hardware with modeling and virtualization software to create the system. For example, on a treadmill a rotational sensor may be configured to measure the rotational speed of the treadmill belt and on a stationary bike sensors may be configured to measure the rotational speed of the crank, position of the handle bars and engagement of the brake or gear shift levers. These sensor measurements are then sent to a computer for use in the physical modeling and visual simulation.

One exemplary aspect of the system is to provide an under desk mount exercise device having hydraulic resistance devices with built in real time rotation sensors on (1) a pedal and handlebar assembly, (2) a rowing assembly and (3) a vertical push/pull assembly for providing resistive force and sending sensor data to a computer for monitoring performance and coordinating video of other real time graphics. Each real time graphic video corresponds to each type of exercise; e.g., rowing on a lake, river or any other body of water, cycling in urban or rural setting, and the vertical push and pull exercise on a railroad track in rural or urban setting.

Another exemplary aspect of the device is an inexpensive rotation sensor based on an ordinary mechanical mouse coupled with software for receiving inputs from multiple sensors and converting the sensor output data from pixels to radians and rotational rates.

Another exemplary aspect of the device involves the generation and use of physics models for visualization. The physics models correlate a crank rate with a corresponding force or torque being generated by the user of the exercise equipment wherein the crank rate relates to the number of revolutions of the sensor per unit time, resulting from the turning of the bike pedals, rowing of oar, or similar exercise motions.

Yet another aspect of the device involves the generation and use of an algorithm for determining calories burned during exercise. This aspect generates a caloric rate table as a function of user weight and effort level for a given exercise and uses spline interpolation to compute caloric burn rates as a function of rotation rate and resistance level.

Yet another aspect of the device involves software for modeling the visual simulation wherein the visual motion is constrained to correspond in real time to the actual motion of the exercise device user. For example, when riding a stationary bike the user's legs and bike pedal positions on screen match the actual user's activity in real time. This aspect uses a look up table (LUT) in combination with sensors to associate the sensor position with the appropriate visualization model for the sensor position.

Yet another aspect of the device involves software for structuring and configuring the visual simulations in a uniquely structured scene graph. A scene graph is a tree data structure commonly used by vector-based graphics applications to arrange the logical and often spatial representations of a graphical scene. This aspect of the software models motion hierarchies, which allow the user to use both physics-based and Open Inventor reference frames in the scene graph.

In yet another exemplary embodiment of the system, users of a multifunctional under desk exercise device can choose from three types of exercise: rowing, curling, and cycling. A calorie counter helps the user monitor the benefits of their exercise, and a manual resistance control allows them to adjust the amount of exertion for their fitness level. The interactive visual simulation that accompanies each exercise provides the user with a virtual reality game environment, simulating natural motion of human-powered vehicles (HPVs). By combining exercise equipment with real-time HPV simulation, the exercise experience is enhanced. The cycling machine, for example, has real-time rotation sensors for steering and pedaling motion. The sensors feed a physics-based rowing, curling or cycling simulation, using Open Inventor™ by Mercury Computer Systems, for visualization. The simulated cycling environment is Planet 9 Studios' Virtual Austin™ model, with enhancements (this data is used by the attached source code to simulate an outdoor urban environment). The application updates the scene graph 20 times per second, using the simulated state data. The Open Inventor toolkit provides efficient rendering performance, real-time synchronization, built-in event handling, and collision detection—all important features for an exercise system.

Various implementations of the exercise device can provide one or more of the following advantages: reduced costs of the computer graphics enhanced exercise device, increased speed and fluidity in simulation graphics modeling; ease of developing new simulations; more accurate caloric burn rate data; and faster visualization.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 2O is a perspective view of an adjustable hinge used in the device shown in FIGS. 2L-2N.

FIG. 11A is an exemplary scene graph showing complete structure for simulation.

FIG. 11B is an exemplary scene graph showing transformation chain for "CAMERA" node.

FIG. 13A is the rail vehicle program algorithm.

FIGS. 13B-13C is the rail vehicle propagation algorithm computer code.

FIG. 14 illustrates an exemplary file directory structure for auto configuring 3D models in applications.

FIGS. 15A-B are the bicycle propagation algorithm.

DETAILED DESCRIPTION

The interactive computer graphics enhanced exercise simulator disclosed herein combines exercise equipment with a computer based real-time simulation of human-powered vehicles (HPVs) that is designed to motivate people to exercise by providing a stimulating interactive exercise experience. The simulations enhance the exercise experience, as well as monitor the amount of calories burned, for weight management. This system enables people to get a variety of physical activity while providing a pleasurable interactive game environment. The system components, including an exercise device component and an interactive computer based simulator component, are discussed in detail below.

According to various embodiments of the present invention, implementation of functionality discussed herein may involve the use of one or more computers. Such a computer might, for instance, include one or more processors, memory (e.g., random access memory (RAM) and/or read only memory (ROM)), and/or one or more input-output interfaces communicating with one another over a bus. Such memory might, for instance, include program code for performing various operations discussed herein. Such program code might, for example, be written in a language such as machine language, assembler, C, C++, Java, and/or C#. Such program code might, for instance, be placed on media such as hard disk, floppy disk, CD, and/or DVD. The computer might, for example, have access to one or more hard disks, floppy drives, CD drives, and/or DVD drives employable, for instance, in loading onto the computer (e.g., into RAM of the computer) such program code for performing various operations discussed herein.

Exercise Device

A wide variety of exercise equipment including for example, rowing, dipping, stepper, cross-country ski, rail car machines or any combination thereof can be enhanced with interactive computer simulations.

Figure 1:
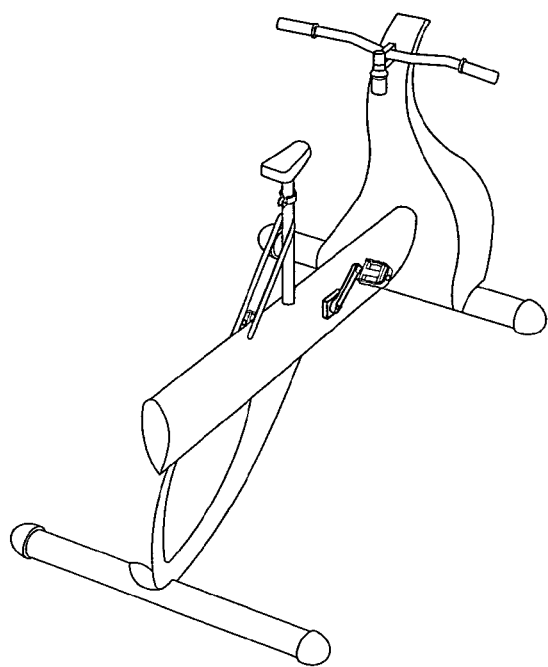
FIG. 1 is an exemplary illustration of a stationary exercise bike.
Figure 2A:
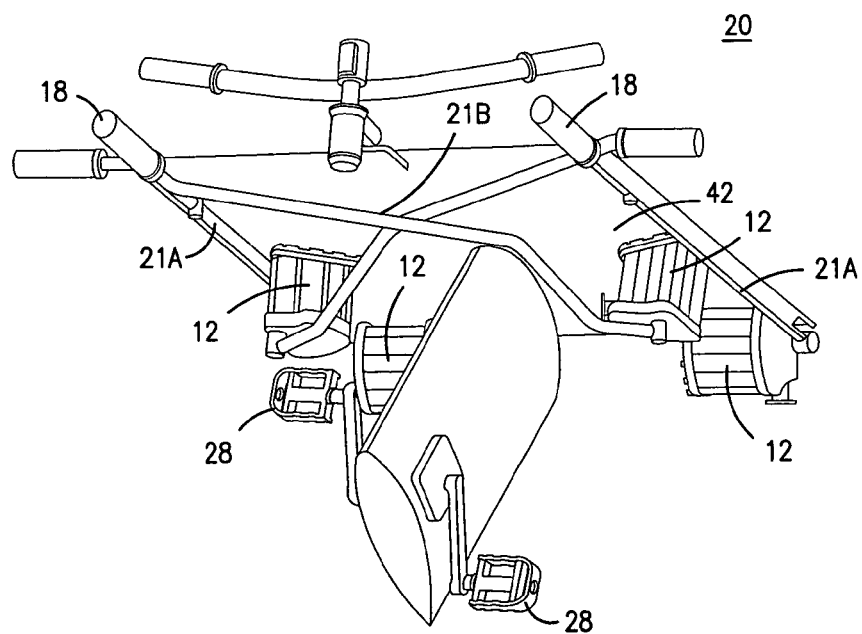
FIGS. 2A-2F are illustrations of an exemplary multifunctional under desk exercise device.
Figure 2B:
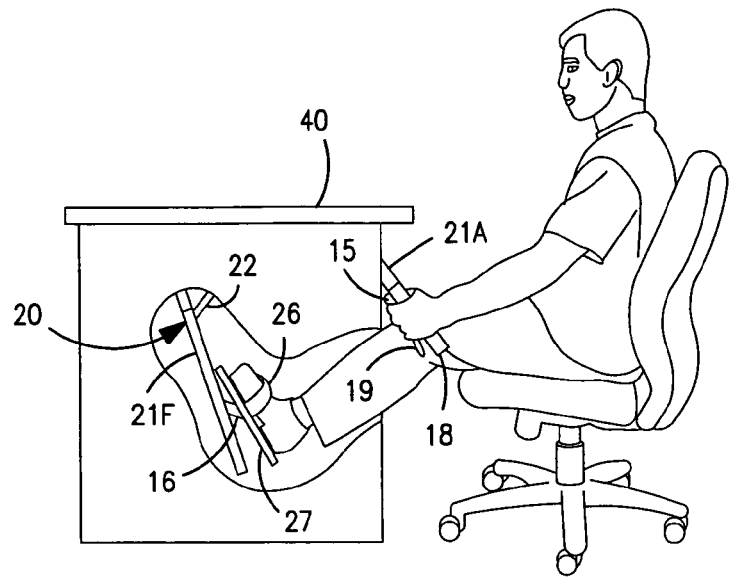
Figure 2C:
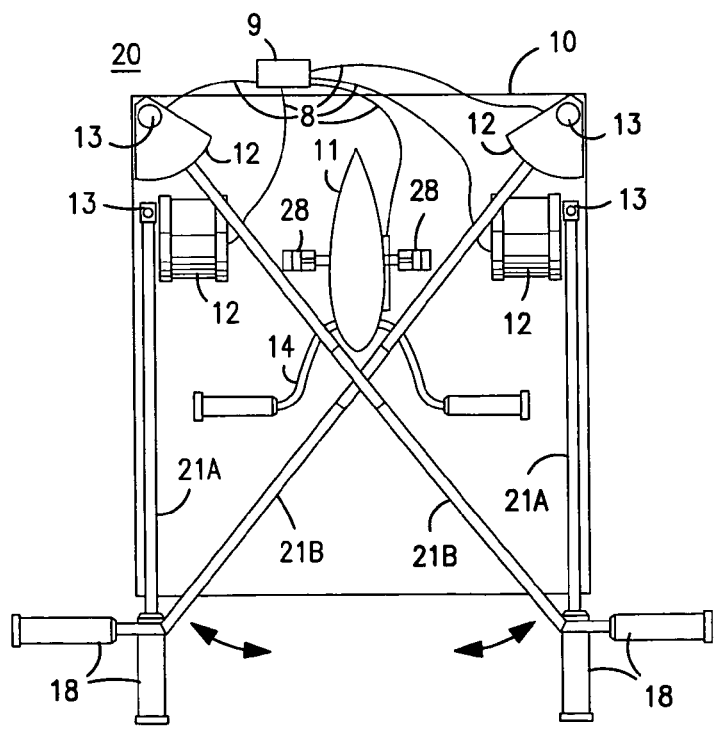
Figure 2D:
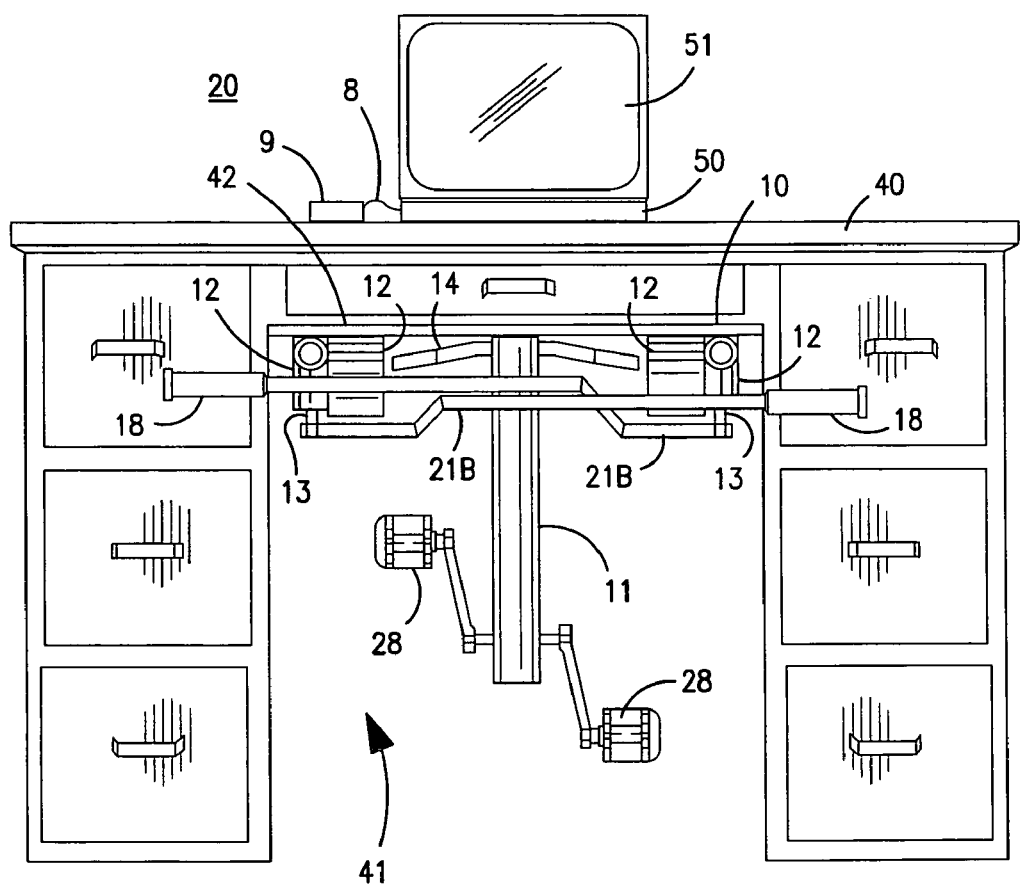

FIGS. 1, 2A-2F, and 2L-2N depict exemplary exercise devices that can be integrated with the computer graphics simulation to enhance the exercise experience. FIG. 1 depicts an exemplary stationary bike fitted with sensors, such as crank sensors, handlebar and brake sensors to feed real time physical al data to the computer graphics enhanced exercise simulator. FIGS. 2A-2F and 2L-2N depict an exemplary multifunctional 3-in-1 exercise machine, with cycling, rowing, and dipping components, which can be mounted under a typical office desk. This device when incorporated with the enhancements disclosed herein provides for an office based interactive exercise device that people can use while working at their desks. Screen shots of exemplary bicycle, rowing and rail simulations are shown in FIGS. 3A-3C. An exemplary list of exercise devices and the associated physical activity and motions are listed in the chart below.

| Vehicle Name | Propulsion | Steering |
| --- | --- | --- |
| Bicycle | Pedaling | Handlebar |
| Tricycle | Pedaling | Handlebar |
| Row bike type 1 | Rowing | Handlebar |
| Row bike type 2 | Rowing | Leaning |
| Snow bike | Pedaling | Handlebar |
| HP snowmobile | Pedaling/track | Handlebar/ski |
| Ice rower | Rowing | Handlebar/ski |
| Rail bike | Pedaling | NA |
| Rowed railbike | Rowing | NA |
| Handcar | Lever motion | NA |
| Rowboat | Rowing | Oars |
| Paddle-wheel boat | Pedaling | Handlebar/rudder |
| Propeller boat | Pedaling | Handlebar/rudder |
| Water polo vehicle | Pedaling | Oars |
| HP submarine | Pedaling | Handlebar/rudder |
| HP aircraft | Pedaling | Handlebar/rudder |
| HP helicopter | Pedaling | Handlebar/rudder |
| HP blimp | Pedaling | Handlebar/rudder |
| Rafting | Rowing | Handlebar |

Referring to FIGS. 2A-2F and 2L-2N, a lever-arm rowing type exercise device 20 is mountable in a leg space 41 under a desk 40, which comprises preferably two adjustable lever arms 21A, attached to a desk surface 42 within the leg space 41 of the desk 40 by a pivotable means, such as a pivot rod hinge 23, at the first end of each of the lever arms 21A with one lever arm 21A on each side.

The device 20 also comprises a tension means, such as a spring means 22 or rubberized cord or an air pressure means 22A, such as an air or oil cylinder or other pneumatic device 22B, which is attached between the lever arm 21A and the desk surface 42 to create a resistance to moving the lever arm 21A for the purpose of exercising by moving the lever arm 21A.

The device 20 further comprises a hand grip 18 that is attached to the second end of the lever arm 21A. The hand grip 18 enables movement of the lever arm 21A by a user. The hand grip 18 has a means for turning, as indicated by the arched two-headed arrow shown in FIG. 1, relative to the lever arm 21A for wrist twisting motion. The hand grip 18 also comprises a squeeze handle 19, which is pivotally mounted to the hand grip 18 with a tension means, such as a spring hinge 15, there between for performing hand gripping exercises, as shown in FIG. 2.

The device 20 also comprises a second lever arm 21F, preferably an adjustable single arm 21F centrally attached to the desk surface 42 within the foot space 41 of the desk 40 by a pivotable means 23 at the first end of the second lever arm 21F. A tension means that comprises a spring means 22 or rubberized cord or an air pressure means 22A, such as an air cylinder or other pneumatic means is attached between the second lever arm 21F and the desk surface 42 to create a resistance to moving the second lever arm 21F for the purpose of exercising by moving the second lever arm 21F. A foot attaching portion 27, which comprises a flat surface 27 mounted on the second lever arm 21F, attached to the second end of the second lever arm 21F by a hinged bracket 16. The foot attaching portion 27 receives the feet of a user for the purpose of moving the second lever arm 21F for leg exercises, as shown in FIG. 2. The foot attaching portion 27, which receives feet of the user has a pair of foot receiving loops 26 attached to the flat surface 27. The foot attaching portion 27 further comprises a pair of foot pedals 28 that attach to the side of the foot attaching portion 27 by a rotateable means that has a tension means, such as a torsion knob 29, for exercising the legs of the user in a bicycle pedaling movement.

The lever arms 21A and 21F are adjustable in length by a telescoping means and are connected together at the attachment means 23 and 24 by two telescoping adjustable rods 17. The lever arms 21A and 21F are removably mountable to the desk surface 42 by suction cups 24 or other mounting means that have a pivot rod connecting means 23 for pivotally mounting the lever arms 21A and 21F thereon, as shown in FIG. 1.

In practice, the lever-arm rowing type exercise device 20 would be mounted to the upper surface 42 of a leg space 41 under a desk 40 by adhering the suction cups 24 for the lever arms 21A and 21F and the tension means 22 or 22A to the desk surface 42. Prior to use the user would need to adjust the telescoping portions of the lever arms 21A and 21F to the desired length.

Figure 2E:
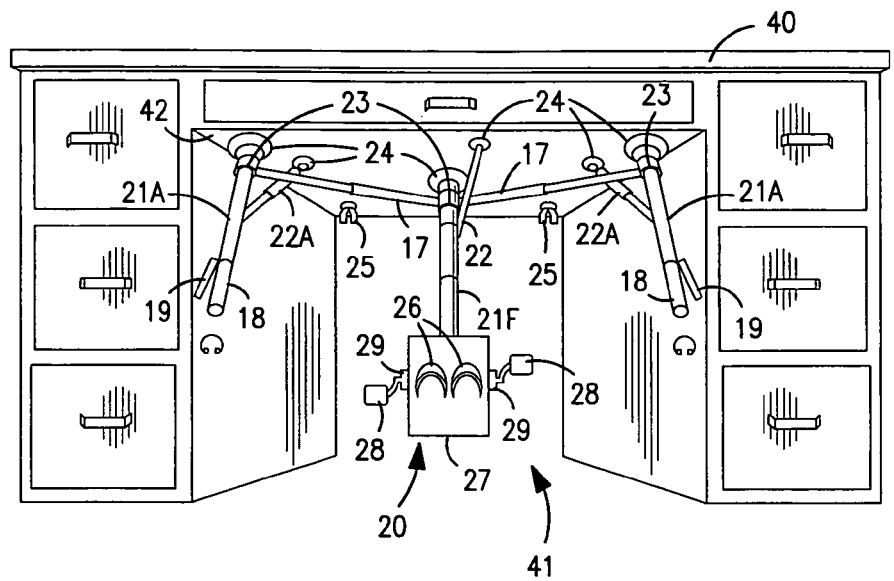
Figure 2F:
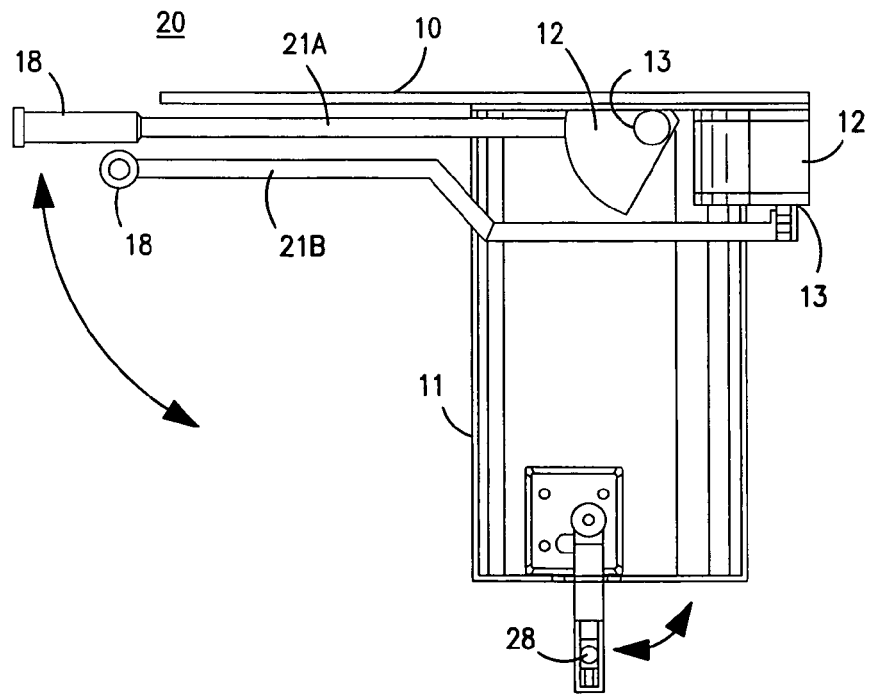
Figure 3A:
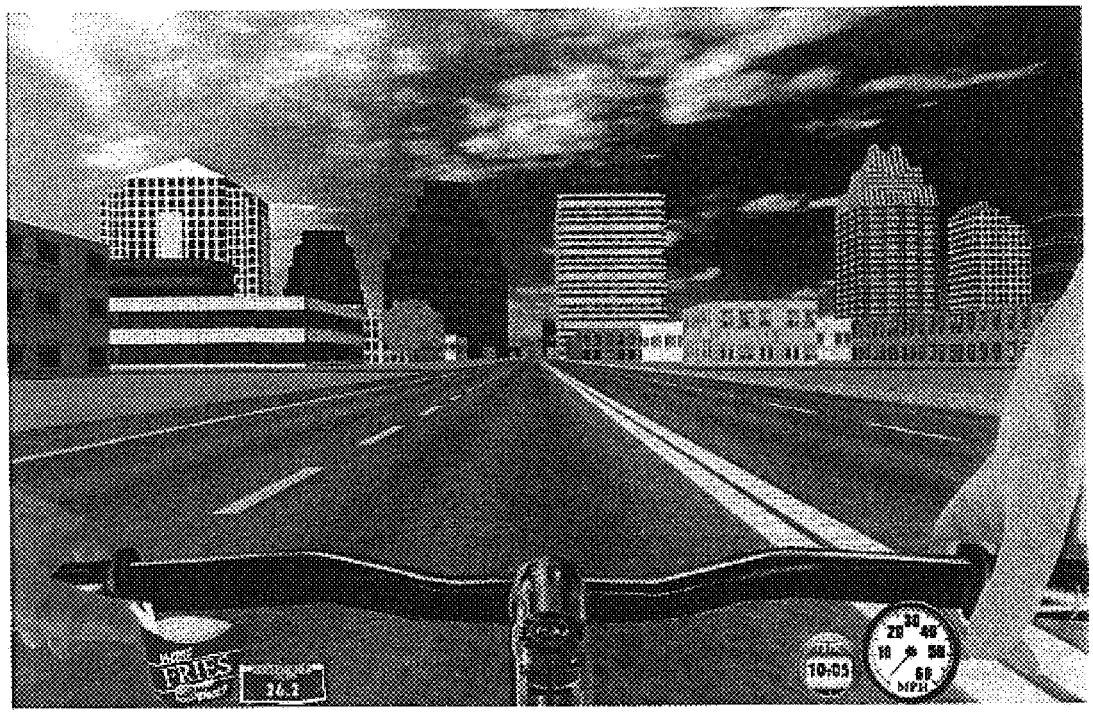
FIG. 3A is an illustration of the virtual reality simulation for a stationary bike embodiment.
Figure 3B:
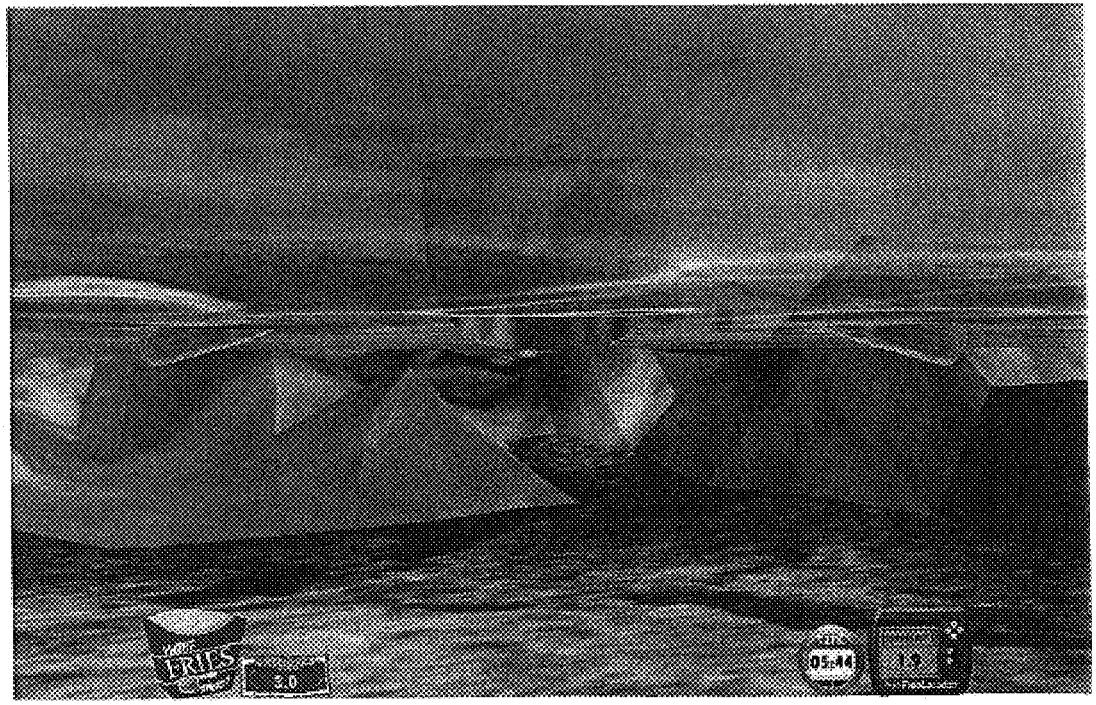
FIG. 3B is an illustration of the virtual reality simulation for a rowing machine device.
Figure 3C:
FIG. 3C is an illustration of the virtual reality simulation for a rail vehicle device.

To exercise the wrists the user would twist the hand grip 18, as indicated by the arched two-headed arrow, as shown in FIG. 2E, relative to the lever arm 21A.

To perform hand gripping exercises, the user would alternately grip and release the squeeze handle 19, which is pivotally mounted to the hand grip 18 with a tension means, such as a spring hinge 15 there between, as shown in FIG. 2B.

To perform arm exercises the user would grasp the hand grips 18 and push or pull the lever arm 21A against the resistant force of the spring 22 or rubberized cord or the air pressure means 22A, such as an air cylinder or other pneumatic means, thereby strengthening the arms, as shown in FIG. 2B.

To perform leg exercises the user would insert their feet into the foot receiving loops 26 attached to the flat surface 27 and push or pull the second lever arm 21F against the resistant force of the tension means 22 or 22A, thereby strengthening the legs, as shown in FIG. 2B. The user could also exercise their legs by placing their feet on the pedals 28, which are attached to the sides of the flat surface 27, and moving the pedals 28 in a bicycling motion.

When not in use the lever arms 21A and 21F may be easily stored with the lever arms 21A and 21F held flat against the desk surface 42 by friction clamps 25.

In FIGS. 2A, 2C, 2D and 2F, a preferred embodiment of the exercise device 20 of the present invention comprises a pair of horizontal rowing lever arms 21B, a pair of vertical lever-arms 21A, and a vertical post 11 with rotateable bicycle-type pedals 28 all mountable in a leg space 41 under a desk 40 or cubicle work surface.

The pair of rowing lever arms 21B is adapted to attach to an under-desk surface 42 within an under-desk leg space 41 of a desk 40. Each of the pair of rowing lever arms 21B comprises a first end attachable to a desk surface by a horizontal pivotable means, preferably an oil filled hydraulic chamber, such as an oil hydraulic resistance adjustable wedge-shaped pivot 12 mounted horizontally at a back of the under-desk surface 41 acting as a pivot resistance means, and a second end having a horizontal handle 18 aligned in a proximal parallel alignment with a front of a desk 40, the handles 18 adapted to be grasped like oars of a boat and pulled toward a user pivoting the rowing lever arms horizontally in a movement simulating rowing a boat with oars in oarlocks.

Each of the pair of rowing lever arms 21B is attachable to the under-desk surface 42 adjacent to one wall of an under-desk leg space at a back of the leg space 41 and each of the handles 18 protrude horizontally out of a front of a desk adjacent to an opposite wall of an under-desk leg space and each of the pair of rowing lever arms is adapted to pivot away from a desk toward a user seated in front of a desk.

The second pair of lever arms 21A is adapted to attach to an under-desk surface 42 within a leg space 41 of a desk, each of the second pair of lever arms comprising a first end attachable to a desk surface by a vertical pivotable means, preferably an oil hydraulic resistance adjustable wedge-shaped pivot 12 mounted vertically at a back of the under-desk surface 41, and a second end having a handle 18 aligned in a proximal perpendicular alignment with a front of a desk 40 sticking out of the desk toward a user seated at the desk. The second pair of handles 18 are adapted to be grasped and pushed forward and down and pulled upward and back, while the oil hydraulic wedge-shaped pivot 12 creates a pivot resistance means to create a resistance to pivoting the second pair of lever arms for the purpose of exercising by pulling and pushing to pivot the second pair of lever arms vertically under the desk 40 in the under-desk leg space 41.

The vertical support 11 is attachable to the under-desk surface 42 of the leg space 41 by a hinge or pivot means for moving the vertical support forward at any desired angle for usage and backward for storage. A handle bar 14 attached to the vertical support 11 is adapted for grasping by a user to tilt the vertical support 11 toward a user to a comfortable angle for pedaling and away from the user for storage, and further adapted for grasping by a user during pedaling for a seated exercise it the desk similar to riding a bicycle. The pair of foot pedals 28 are attached to the vertical support 11 by a rotateable means having a tension means for exercising a user's legs in a bicycle pedaling movement. Bicycle pedal motion can be either elliptical or circular in motion.

Referring to FIG. 2O, a hinge is used to adjust the pedal assembly for differing leg lengths. The pedal assembly is attached to the base plate, which is attached to the underside of the cubicle desk. The hinge allows the pedal assembly housing to pivot on the front hole axis and to be pinned to one of four rear pin axis locations. This pivots the pedals closer or further away from the user. It also changes the knee clearance close to the desk. This hinge is produced using the extrusion process, which has advantages for cost reduction. This open form can easily be extruded and the extrusion is simply cut to length. In the present embodiment the pivot axis hole is drilled as a post operation but in the future the pivot hole will also be extruded making the fabrication process just cutting it to length and adding the mounting holes. This thick material allows for the stresses of the pedaling assembly to be withstood easily. In another embodiment the adjustment pin will be on a remotely actuated handle such that the pedal assembly can be adjusted by pulling a knob near the user. This removes the requirement that the user reach deep under the desk to pull the pin and then reinsert the pin into the new location of choice. This remote release mechanism will pull the pin with a cable or rod attachment between the handle and the adjustment pin and a spring will return the pin into the adjustment location chosen. The pedal housing may also have a spring to push the weight of the pedals forward and your feet can push the pedal housing to the rotation angle that is most comfortable and the adjustment pin will be released and its spring will pin the hinge. The length of the extrusion is made to be a clearance fit inside the pedal assembly housing providing the constrained rotation movement.

The pedal housing has two holes that are spaced apart the distance between the pivot axis and any one of the adjustment axis. It has a cavity in its top that is just under the width of the hinge extrusion cutoff. The axis pin and the adjustment pin are of sufficient diameter to withstand the large forces that can be applied by a forceful user with their leg muscles. The pin materials and hinge materials need to have compatible hardnesses and wear properties.

The exercise device of the present invention further comprises a motion sensing means built into each of the oil wedge pivots 12 and bicycle pedal resistance and at least one cable 8 from the sensing means to a USB port or other link means 9 to a personal computer 50 to transmit motion data to the computer, and a software program in the computer to process the motion data and translate it into health related information, such as the number of calories burned during each exercise session, which information may be viewed on the computer monitor 51 using graphics and words and sound if desired and simulated images related to an exercise. Cable 8 also sends control bits back out to the hardware to control resistance via the leak rate of the oil in the resistance device 12.

The lever arms 21A and 21B and oil wedge pivots 12 and the vertical support 11 of the present invention are each attachable to an underside of a desk by an attachment means taken from a list of attachment means including double stick tape, suction cups, threaded fasteners, directly or indirectly by an attaching plate 10 secured to an underside of a desk by brackets or threaded fasteners or adhesive attachment means.

The lever arms 21A and 21B are telescopically adjustable in length and have a spring or tensioned rubberized cords or an air cylinder or other pneumatic system connected between the lever arm and the desk, which provide resistance while exercising. When not in use the lever arms are easily stored and held flat against the desk by friction clamps, magnets or other suitable securing device.

The lever arms, which are to be used for arm and upper body workout, include a hand grip that enables movement of the lever arm by a user. The hand grip also has a means for turning the grip relative to the lever arm for wrist twisting exercises. The hand grip may also include resistance. The grip turning motion may be used to control the row boat bobbing and tilting in the water based on the 3D vector for the power transmitted to the water via the oar surface. The hand grip further comprises a squeeze handle that is pivotally mounted to the hand grip with a tension means, such as a spring hinge, there between for performing hand gripping exercises.

Resistance Devices

Figure 2G:
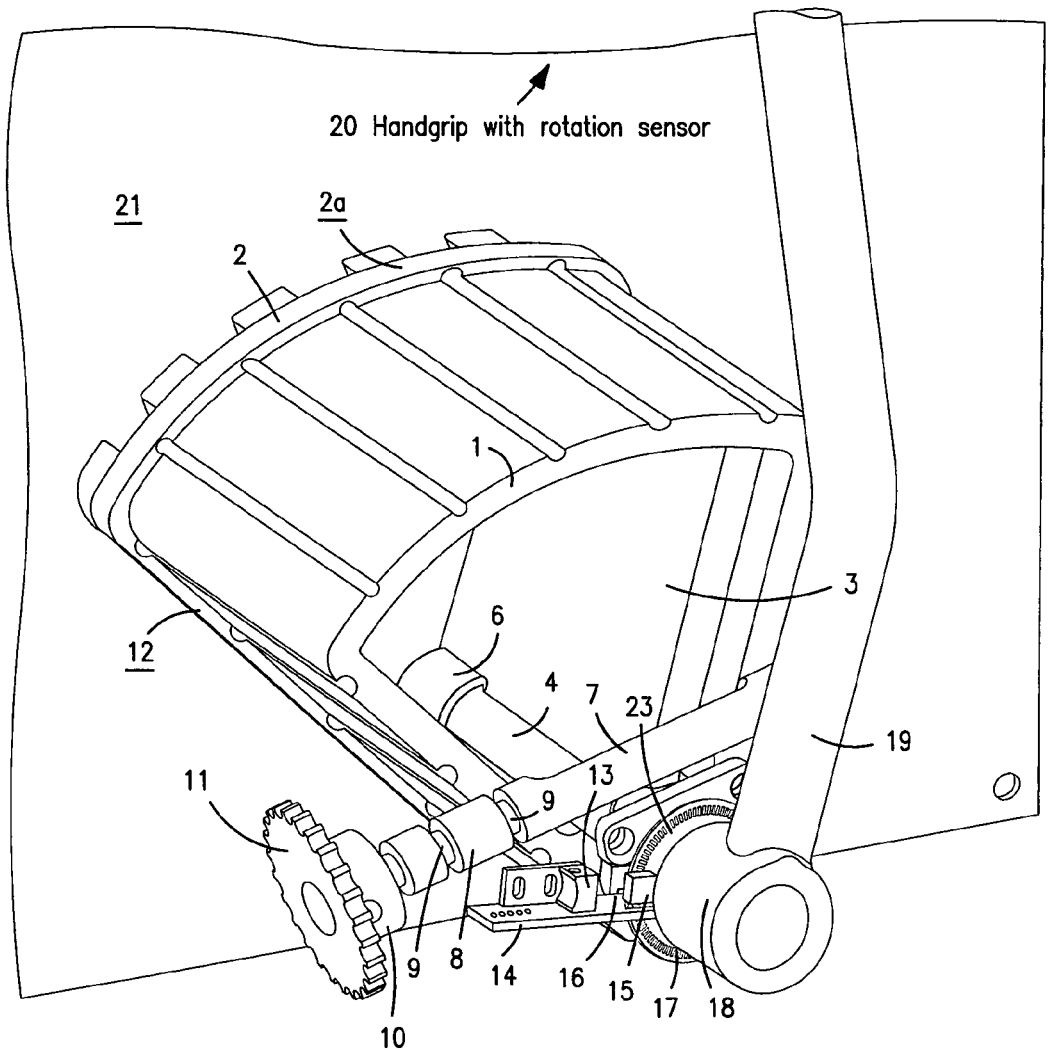
FIGS. 2G-2I are perspective views of resistive wedge for the rowing and dipping bars of the under desk exercise device.
Figure 2H:
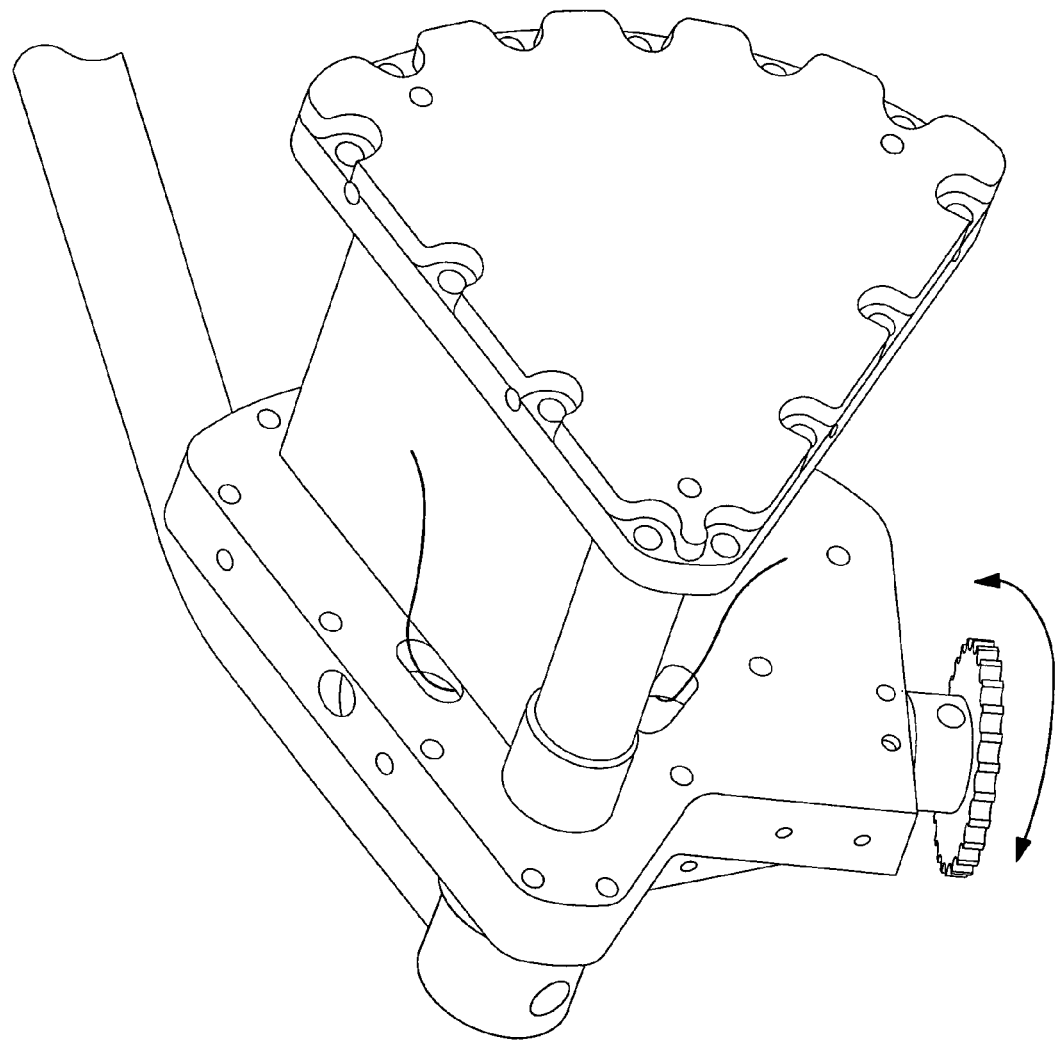
Figure 2I:
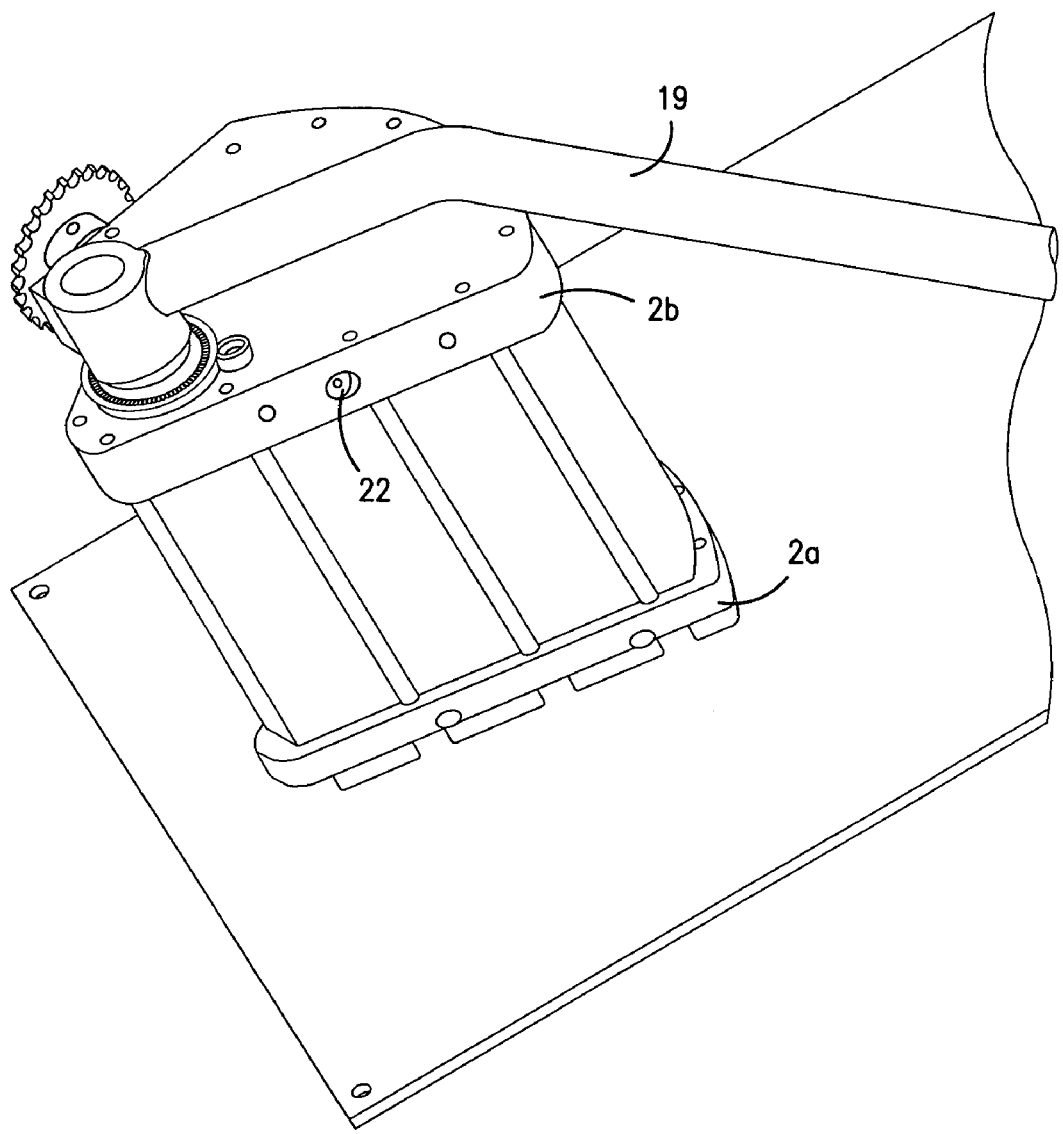

FIGS. 2G-2I illustrate one embodiment of an exemplary resistive wedge. The restrictive device comprises a housing extrusion 1 and end plates 2a and 2b which form an oil reservoir in which paddle 3 resides. End plate 2b forms the end of the oil chamber and contains the valve. It also provides mounting for the resistive block 12 to the mounting plate 21 to the underside of the desktop and performs a thermal transfer from the oil to the surrounding environment and desk mass. End plate 2b also contains the oil pressure weep hole 22 that allows the oil to escape during assembly of the resistive block 12. As the main bolts through the end plates are tightened the chamber reservoir volume decreases and the oil trapped in the chamber escapes through the weep hole 22. In the absence of the weep hole 22, destructive pressures would build up inside the chamber during manufacture.

Paddle 3 is disposed in the oil reservoir formed by housing 1 and end plates 2a and 2b. Paddle 3 is connected to the main shaft 4. Main shaft 4 is held at one end against the end plate 2a by bronze bushing 6 and is held rotationally at the other end by bronze bushing 6 in end plate 2b. The main shaft 4 is manufactured from a very strong material so it can handle the force of strong users without bending.

Bushings 6 are intended for long wear and are preferably made from a sintered bronze with oil impregnation so that as the material wears it exudes oil increasing wear life. The bushings 6 are preferably submerged in oil so they will last even longer. Bushing 7 is similar to bushing 6 except that bushing 7 is preferably longer than bushing 6 and aligns the extrusion bore to the valve plate bore as it partially presses into both pieces to maintain co-linearity and guarantee that the oil seal lips are equally flexed and wear longer.

Valve shaft 8 has a large flat area that allows oil to flow between the chambers depending on its rotation about its long axis. It preferably goes from fully open to fully closed in about 20 degrees rotation to allow it to have very fast response to the resistance under computer control. There is preferably a redundant O-ring seal 9 in case one O-ring gets damaged in assembly. The outer groove 10 is used to keep the valve shaft in the housing as precision ground pins are pressed into the housing trapping the shaft longitudinally but allowing free rotation.

The manual knob 11 can alternatively be replaced with either a servo motor or a stepper motor or a solenoid motion to automate resistance control. These electromechanical devices will be under computer control (e.g., via a USB cable) and will determine the resistance.

Seal holder 23 keeps the oil seal from blowing out of its press-fit grip in the event pressure builds up in this closed chamber during assembly. This may happen when the device is shipped in a hot truck as the thermal expansion of the oil creates pressure that cannot be relieved by the flexure of the housing plates. Bracket 13 hold the printed circuit board 14 associated with the sensor shown in FIG. 4. Photo transistor 15 opposite the LED light source 16 are mounted with the circuit board on bracket 13. Sensor wheel 17 with holes around the perimeter for the optics to look through is mounted to the sleeve main shaft 18 or main shaft 4. Rowing bar 19 is connected to the main shaft 4 for driving the paddle 3 and may or may not have a rotation sensor mounted to the handle grip for feathering feature during rowing. Rubber hand grip 20 may be an ordinary bikes grip which provides a soft feel to the hands and resists the hand sliding on the bar. A sensor ring with the larger bore center is mounted on axis with the rowing bar. The printed circuit board would be mounted to the bar and the sensor is be mounted to the rubber handle grip. The rubber handle grip is on bearings so that it rotates on the long axis of the rowing bar. Accordingly, the users wrist motion rotating the grips is measured by this apparatus allowing the rowing simulator to produce a simulated feather technique to the rowing of the simulated boat.

This mounting plate 21 is used to anchor the device to the underside of the cubicle desk top. There are four holes on the corners to attach the assembly to the desk with a self drilling screw.

In operation, paddle 3 sloshes oil from one side of the rotational chamber to the other. The oil leaks past all edges between the paddle and the walls of chamber keeping the paddle lubricated. The viscosity of the oil determines the resistance with the valve shut as the oil leaks slowly past the edges. With the valve open the oil has two parallel paths—it still leaks around the paddle and in addition it leaks through the cavity that is created when the valve is turned so that the cut away flat area of the valve shaft 8 opens the cavity.

Figure 2J:
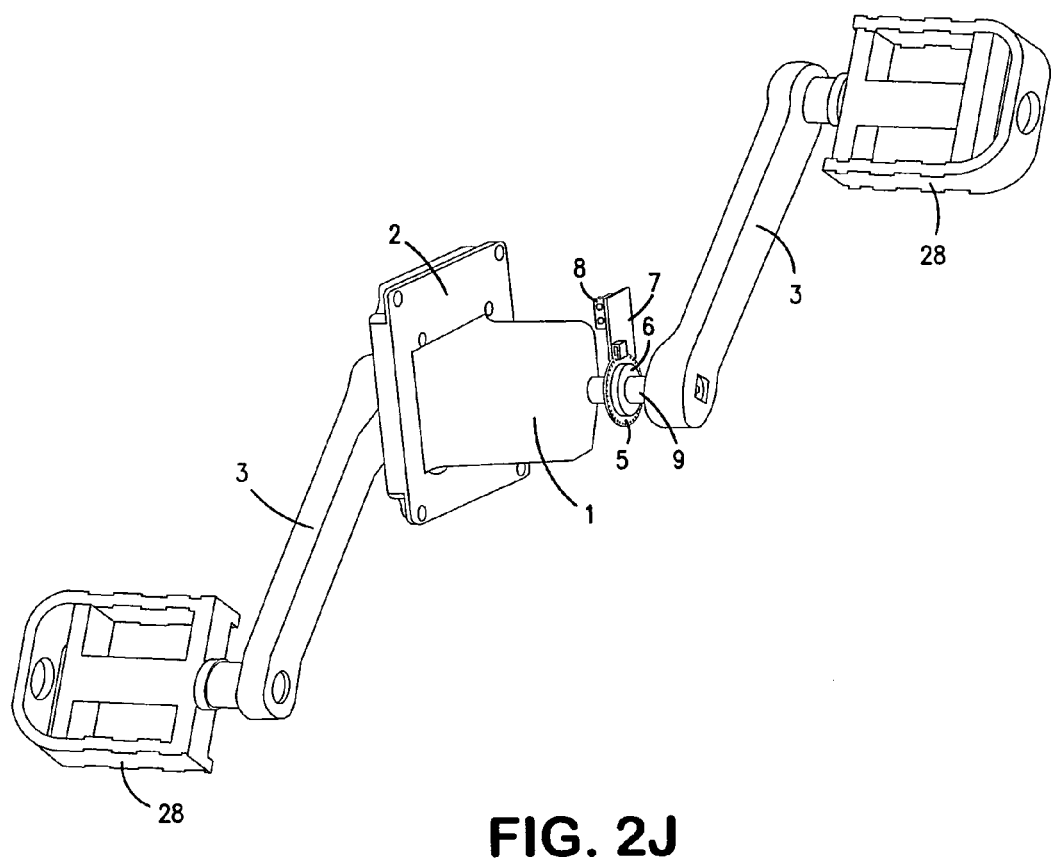
FIG. 2J is a perspective view of the pedal assembly of the under desk exercise device.

Referring to FIG. 2J, the pedal assembly includes, a resistive device 1 having a shaft 9 that passes through and engages the resistive device 1 and exits out both ends of the housing. The output orifice has a restrictor that is variable based on computer control. Mounting plate 2 contains an oil seal for the pedal shaft with an alignment bushing for wear and to maintain concentricity with the oil seal. Crank arms 3 are connected to the shaft 9. Crank arms 9 are shorter than standard bicycle crank arms to accommodate the short height under a cubicle desk. Pedals 28 are connected to the end of the crank arms 9. The pedals 28 are standard bike pedals with one being left hand thread and the other being right hand thread just like a bike.

A sensor wheel holder 6 is attached to the crank shaft 9. The sensor wheel holder 6 holds the thin etched sensor wheel 5 and uses a set screw to the shaft to hold the sensor normal to the shaft axis.

The sensor wheel 5 is attached to sensor wheel holder 6. The sensor wheel 5 is chemically etched from 0.010" thick stainless steel and has a hole pattern around the outer edge which permits light from an optical sensor to pass through the wheel and measure rotation. The sensor wheel perimeter is expanded to fit the particular shaft that it is on. For example, the pedal is the same diameter as the rowing but the bike steering is bigger to go around a standard bike post, and the rotation sensors of the rowing feather feature are bigger so that they fit around the diameter of the bars.

Printed circuit board (PCB) 7 includes an LED and photo transistor for detecting sensor wheel rotation by transmitting and detecting light passing through the sensor wheel hole pattern. PCB bracket 8 holds the PCB in relation to the holes in the sensor wheel. PCB bracket 8 can be die cast, machined or the like and screwed to the pedal assembly housing.

Figure 2K:
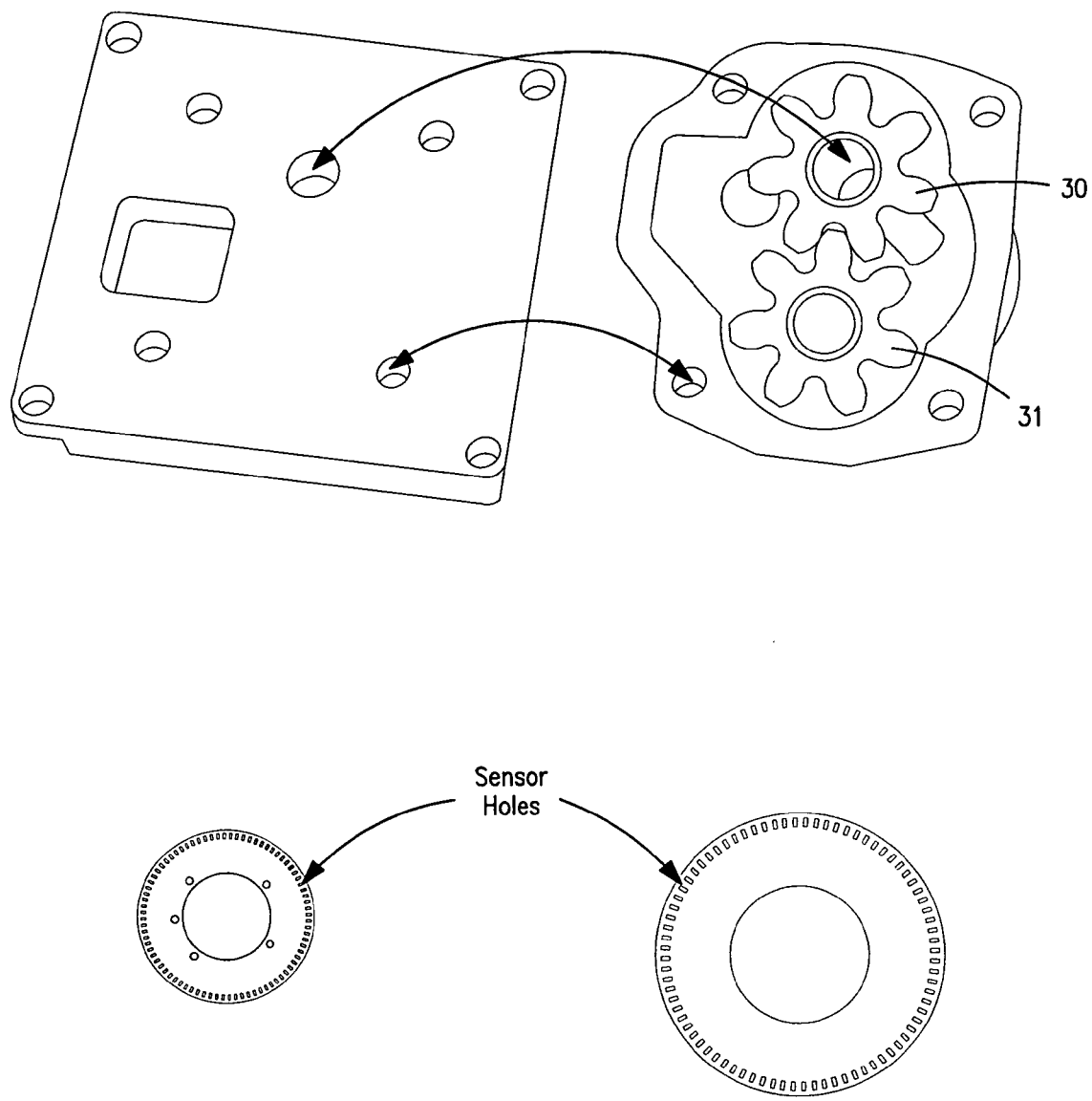
FIG. 2K is a sectional view of the pedal assembly resistive device and plan view of crank shaft sensor wheel and handle bar sensor wheel.
Figure 2M:
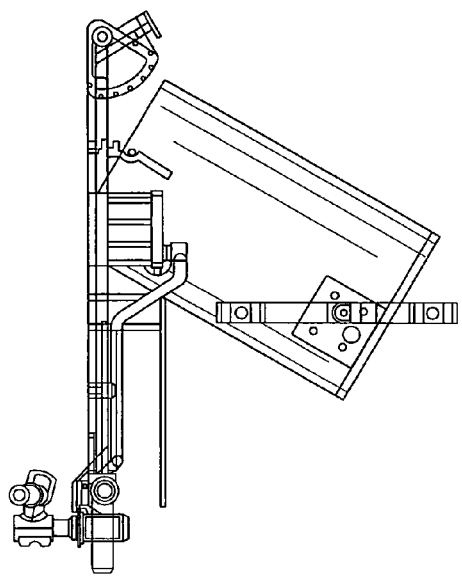
FIGS. 2L-2N are front, bottom and right side view wireframe models of an exemplary multifunctional under desk exercise device.
Figure 2L:
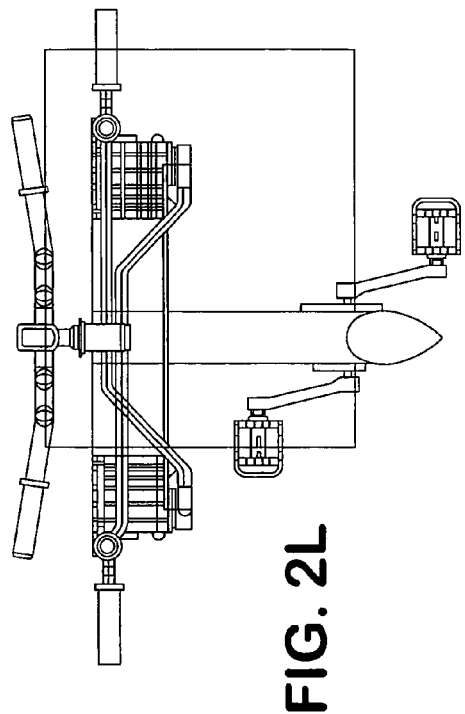
Figure 2N:
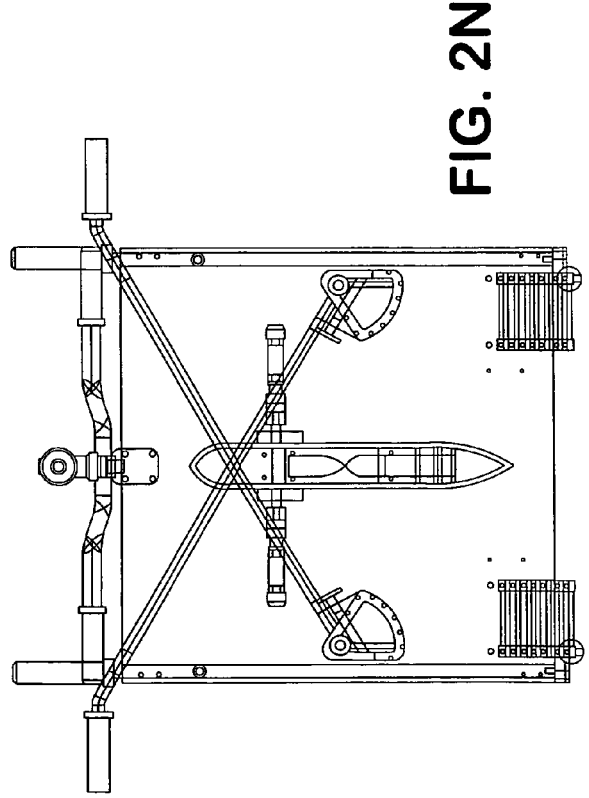
Figure 20:
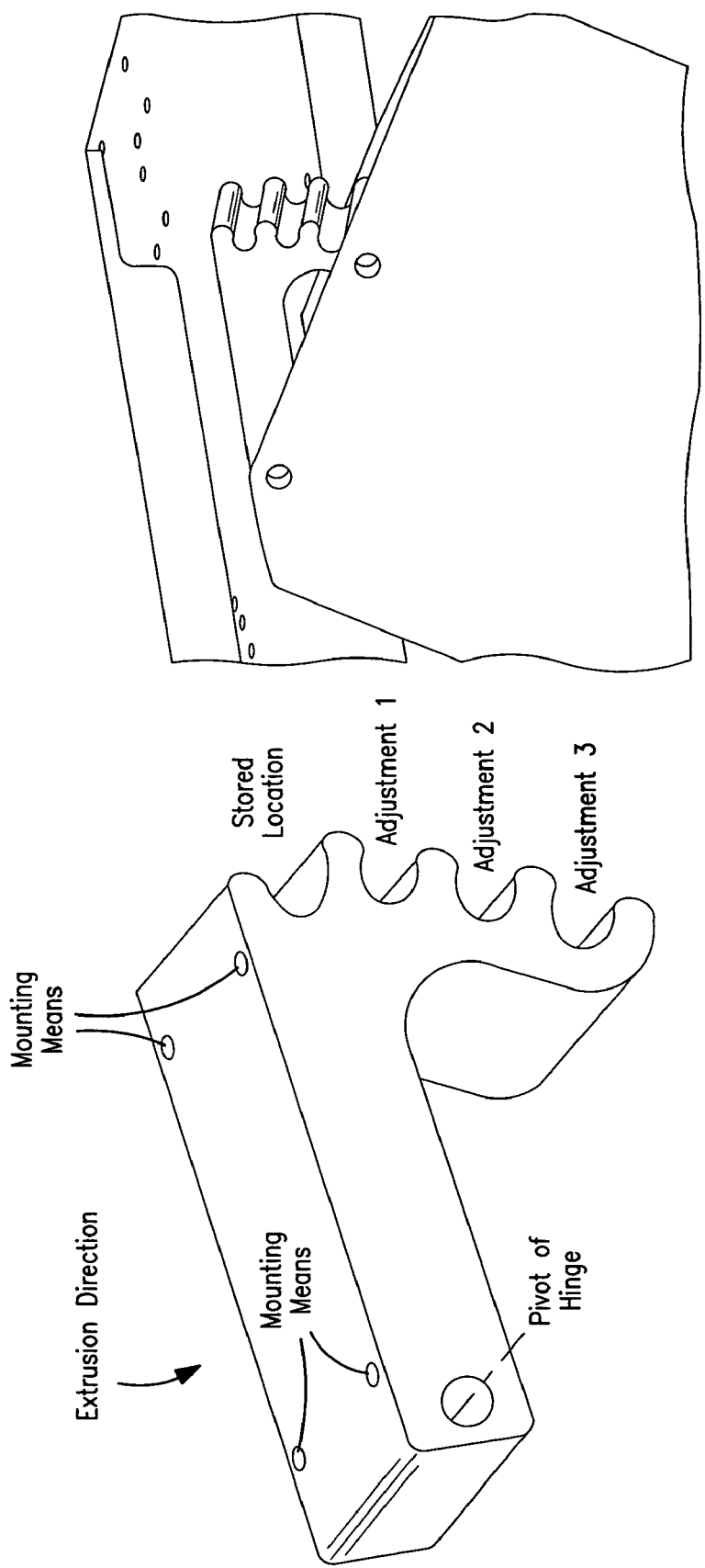

Referring to FIG. 2K, a sectional view of resistive device 1. The cogs 30, 31 of resistive device 1 rotate in synchronization with each other. As the cogs 30, 31 rotate they trap oil between the outside teeth and the housing. The oil is choked off between the cog's intertwining teeth. The oil flows left to right in FIG. 2K and the choke point for resistance is in the resulting oil flow out the back. In various embodiments a servomotor or stepper or solenoid may be used to partially block this hydraulic flow and vary resistance to make it harder or easier to pedal. The oil viscosity as it passes through the restriction under computer control provides the force that is felt in the pedals. The oil being pushed through a small opening heats up the fluid so that mechanical motion is converted to heat energy and this heat energy is dissipated to the environment via the large thermally conductive surface of the assembly. Because the computer is very fast in relation to mechanical motion time, the gear change feel of a de-railer can be simulated and in a slower sense force required to go up a virtual hill can be increased. The opening and closing of the oil opening is calibrated back into the calorie burn calculation via a table look up. The computer integrates this incremental calorie burn to determine the daily progress that is reported to the screen in real time and also stored in a database for future tracking of progress.

In other embodiments of the invention the resistance may be provided by any other resistive mechanism, including, hydraulic cylinder, oil cylinder means, pneumatic air cylinder, spring means; rubber cords means, electric generators and magnets (electrical or permanent magnets.)

Data Acquisition System with Mechanical Sensors

Another advantageous aspect is the use a USB based rotation sensor coupled with a sensor interface (e.g., CPNMouse API) and sensor management software to provide a real-time rotational sensors and data acquisition system which sends real-time angle and rate data to the physics subsystem.

Figure 4:
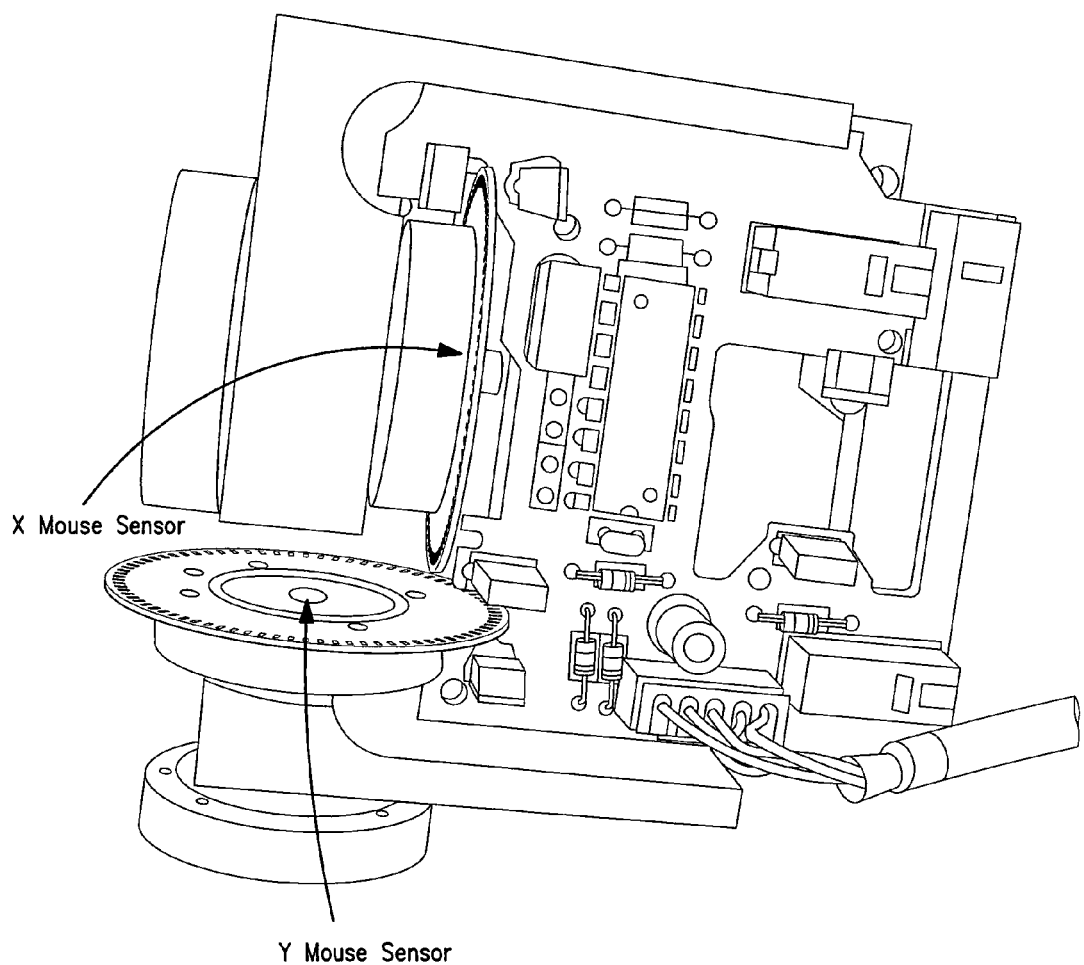
FIG. 4 is a perspective view of a rotation sensor.

Referring to FIG. 4, the rotation sensors may be based on a commonly available mechanical computer mouse or track ball, which typically includes two rotational sensors for measuring the mouse ball's rotation in an x and y axis. A sensor can be assembled from the internal working of a mechanical mouse. Both wireless RF and USB mice can be used as sensors, since the mouse interface API's (such as CPNMouse) work with any Windows mouse, via the API. As shown in FIG. 4, a circuit board removed from a mouse is mounted on a sensor platform. Custom wheels are attached to rotation axes on each moveable component, including in various embodiments, the handlebar, bike crank, oar handles, and curling lever.

The printed circuit board from the mouse remains exactly the same but the sensor wheels 5 are disks with a series of holes around the edge which allow for an LED/receiver set of optic parts to measure rotation. These measurements are sent via multiple USB connections back to the computer where the API and sensor interface convert the count from the circuit into a corresponding rotation rate. The sensor wheel 5 is preferably etched from 0.010" thick stainless steel and preferably has a hole pattern similar to the component inside a mechanical mouse mechanism.

One or more mice can be used per hardware component, using virtual mouse names, i.e., two mice are assumed, but virtual mice can use the same CPNMouse ID. The names correspond to the hardware components so all names should be unique. In one embodiment, the CPNMouse ID can be shared because the same mouse is used to control two hardware components. In another embodiment separate mice are used for each component so the only time we reuse CPNMouse IDs is with a handheld mouse rotation device. Accordingly, the system cannot use the same name, but can use the same ID for two sensors that share the same mouse. Mouse manager software maps these sensor ID's (e.g., CPNMouse ID's) to corresponding physical device sensor names; e.g., PEDALING, STEERING, LEFT OAR, RIGHT OAR, LEFT_LEVER, and RIGHT_LEVER.

Figure 5:
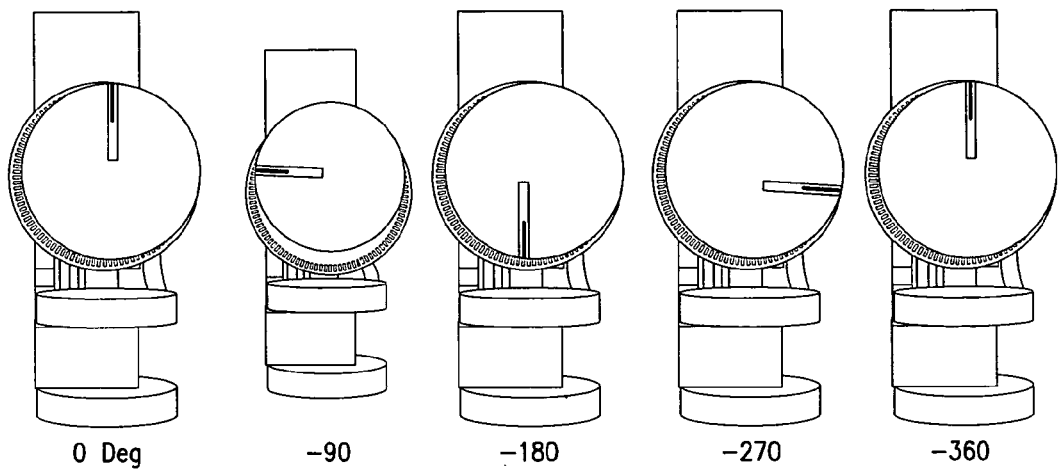
FIG. 5 is an illustration of the calibration steps for calibrating the rotation sensor.
Figure 6A:
FIG. 6A is an illustration of the synchronization of a pedal crank sensor position with a corresponding visualization model for a stationary bike embodiment.
Figure 6B:
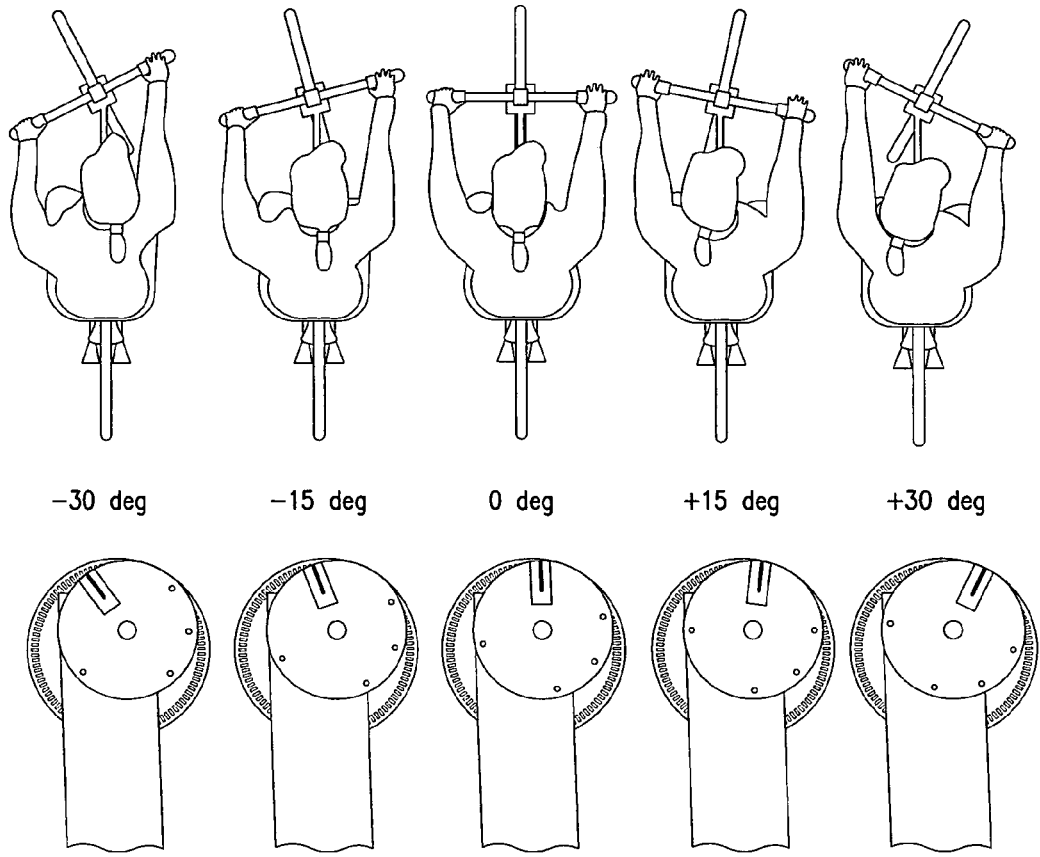
FIG. 6B is an illustration of the synchronization of a handle bar sensor position with a corresponding visualization model for a stationary bike embodiment.
Figure 6C:
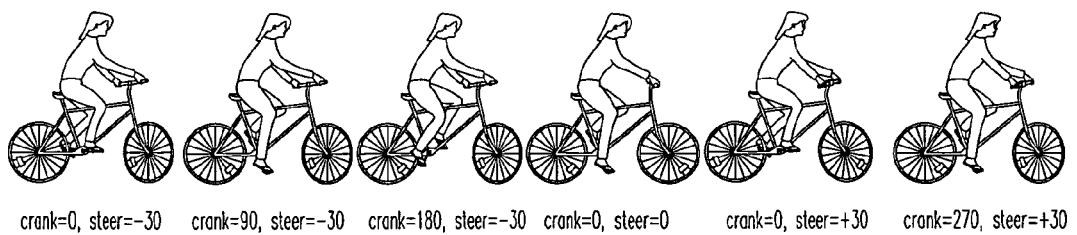
FIG. 6C is an illustration of the synchronization of the pedal crank sensor position and handle bar position with corresponding visualization models for a stationary bike embodiment.

Because the sensor output is ordinarily given in pixels, each sensor is calibrated using a custom rotation device shown in FIG. 4 to determine the pixels-to-radians scale factors. This calibration routine uses the angle pointer attached to the rotation wheel to measure pixel output at 90 deg. delta-rotations, as seen in FIG. 5. The rotation angles are then divided by the pixel outputs, to compute the pixels-to-radians scale factors.

Using the pixel-to-radian scale factor, the acquired absolute and relative mouse positions (e.g., acquired by the CPNMouse API), are converted to angles using the pixels-to-radians scale factor. A physics subsystem then uses the data acquisition system with real-time sensors to compute the real-time rotation angles and rates. Rotation angles are modified to lie within physical ranges, like +30 to −30 deg. for the handlebar. Rotation rates are computed by dividing relative rotation angles by the real-time simulation timestep. The rotation rates may also be limited to not exceed the measured max rates from the calibration tests, e.g., crank rates, oar rates, etc. Rotation rates are used extensively in the simulator. For example, real-time propulsive forces and torques as well as caloric rates are computed as a function of rotation rate, which indicates effort level (i.e., more power=increased sensor rates)

In another embodiment, in addition to the mouse rotation sensors the sensor interface also includes digital control signals going back out to the sensor for force feedback. These signals in the interface are used to adjust the force (resistance) of the exercise resistive blocks.

Software for Modeling Physical Simulations

The simulator component of the disclosed exercise device includes a physical simulation portion. The physical simulation portion of the system propagates the vehicle state using physics models and numerical integration of the equations of motion over the simulation timestep. The propagated state is used to update the scene graph, including the heads up display (HUD) elements, combined with real-time sensor inputs.

Software for converting sensor data to physical simulation inputs uses a unique mathematical mapping from rotation rates to the input forces and torques, used in the physics model. This conversion maps crank torque, oar force, and handcar crank torque, as a function of crank rate. Given the real-time crank rate, the force and torque are directly computed using the equations shown in FIGS. 7A and 7B.

The maximum rotation rate of each propulsive element is determined empirically, using extreme tests with the user exerting maximum power, e.g., a cyclist pedaling as fast as possible, a rower rowing at max power, etc. Once the max rotation rates are known, these tests are performed for each resistance setting, and tabulated as a function of resistance level. The rate that the oil in the resistive devices moves has a significant affect on how much force it takes to move the mechanism. The calibration of the force versus rate is computed in software to keep the calorie counter correct. The max crank rates are then used to form sets of linear equations as a function of crank rate, as seen in FIGS. 7A and 7B.

Figure 12:
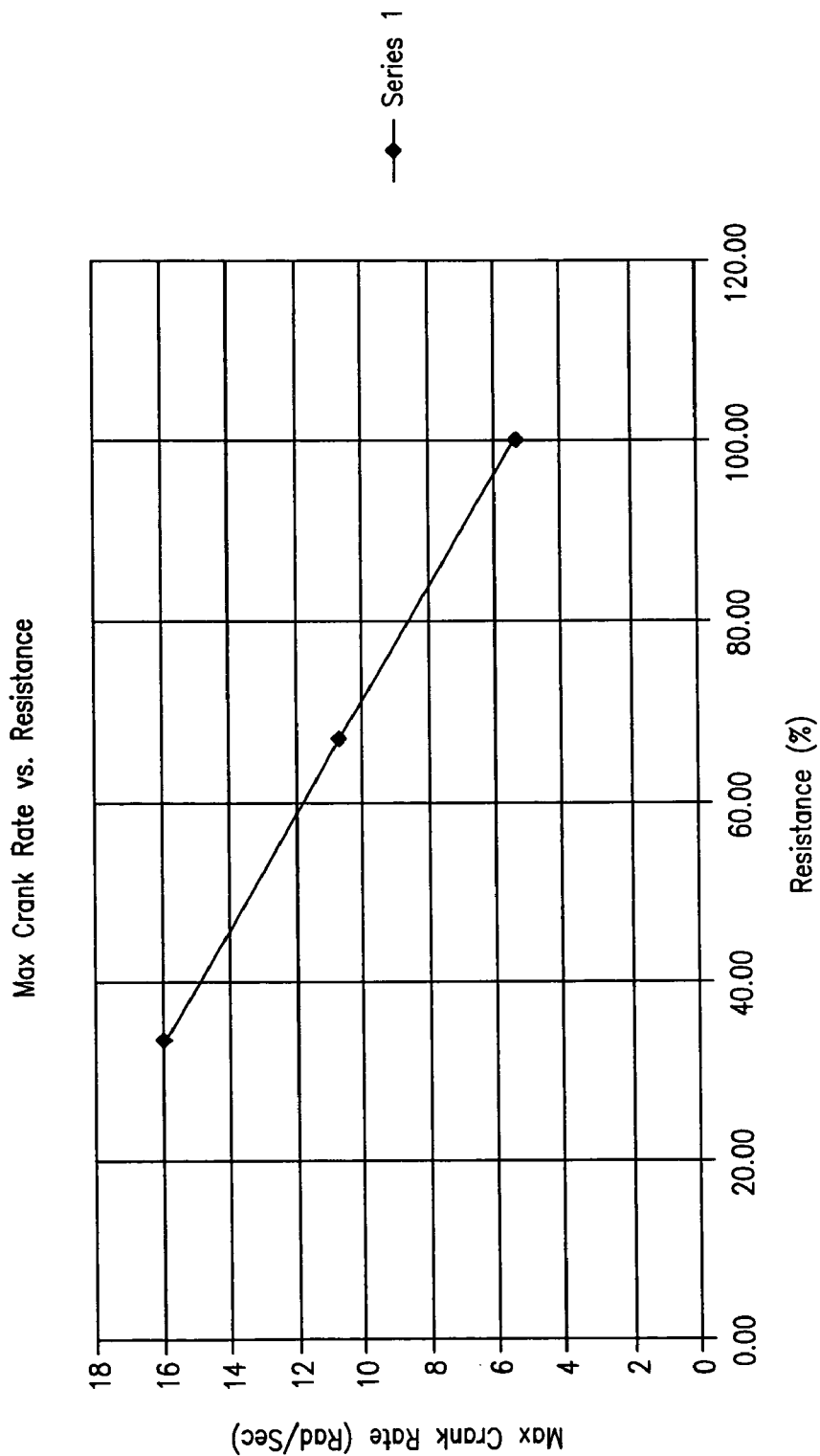
FIG. 12 is a graph illustrating max crank rate vs. resistance, for three resistance levels: 100%, 66% and 33%.

Referring to FIG. 12, maximum crank rate is modeled as a linear function of resistance, such that the resistance setting can be used to compute max crank rate. The resistance setting is stored in a database, and used to update max crank rate, which is used in the equations for force, torque, and caloric rate, in the physical simulations discussed below.

Figure 7A:
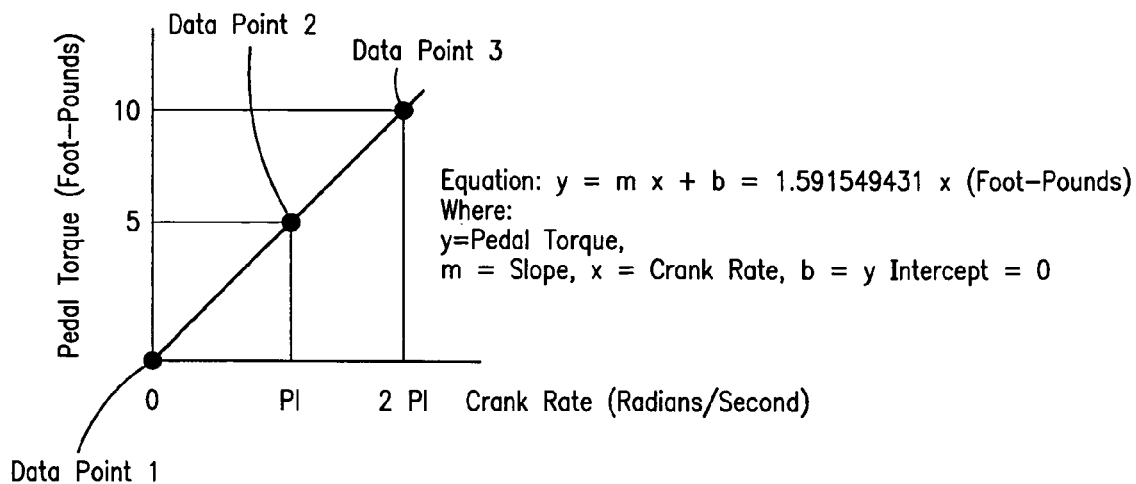
FIG. 7A is a graphical representation of the relationship between pedal crank rate and pedal torque in the stationary bike embodiment.
Figure 7B:
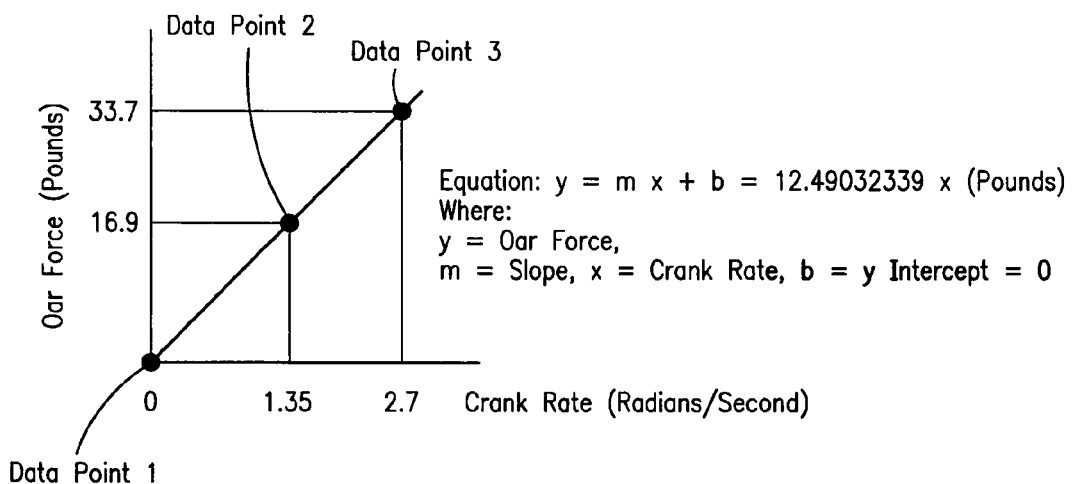
FIG. 7B is a graphical representation of the relationship between oar rate and oar lock force in the rowing device embodiment.

The physics subsystem uses the equations shown in FIGS. 7A and 7B to compute input forces and torques, as a function of real-time sensor rates, i.e., crank rate, oar rates, and handcar lever rates, for a given resistance level. Input forces and torques are set to 0 for negative sensor rates, e.g., no crank torque when the user pedals backwards. Sensors can also be zeroed-out, by pressing the Z key, if necessary, putting the vehicle on a straight line trajectory. (i.e., steering angle=crank rate=0).

The calorie counter uses a unique algorithm to compute calories burned, by integrating real-time caloric rates for a given exercise and effort level. Caloric rates were tabulated as a function of user weight and effort level, for a given exercise, using the NutriStrategy® software. Tables were generated at 1-pound intervals, up to 500 pounds, at five effort levels: very light, light, moderate, vigorous, and very vigorous. Spline interpolation is used to compute caloric rates as a function of crank rate and resistance level, for a given weight.

Effort levis approximated as a function of crank rate, based on a percentage of the maximum crank rate. The interpolated caloric rates are scaled by the resistance factor, to account for the exercise level setting.

Diet and exercise progress can be tracked based on calories burned and dietary information stored in the user database. Companies can use this information for tracking employee activity, for wellness programs and health insurance purposes.

Figure 8:
FIG. 8 illustrates an exemplary calorie counter HUD with text and fry container for visualization.
Figure 9:
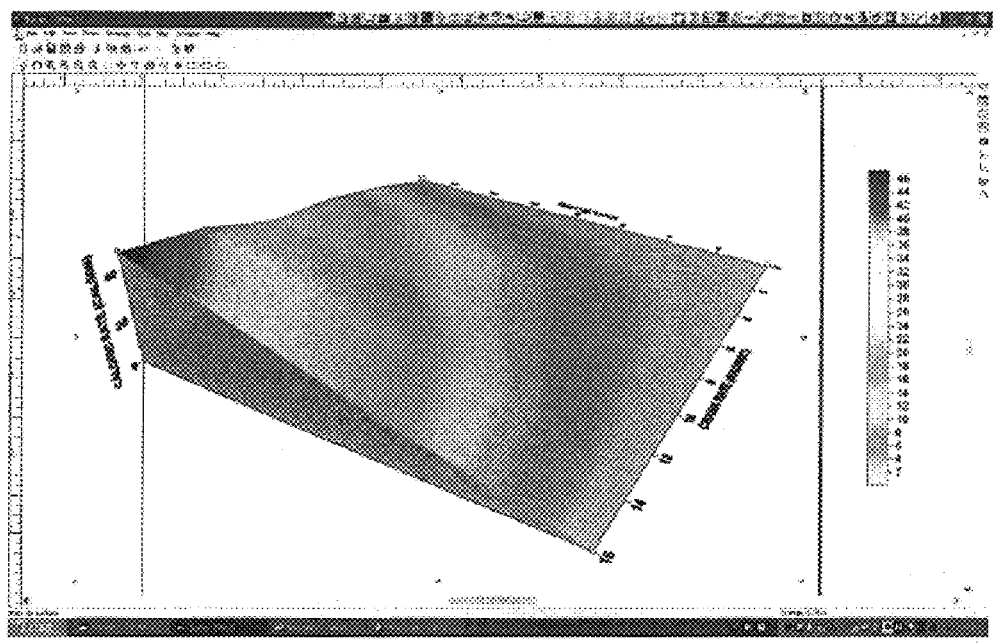
FIG. 9 is a tabular representation of the caloric burn rates for a given torque and body weight.

Referring to FIG. 8, an exemplary graphic means used to show the calories burned by the exercise is a French fry box that fills up with individual fries as each fry is earned by burning the equivalent BTUs of that fry. This is a device to show the user how much effort it takes to make up for overeating in a calibrated way. In addition to this device for educating the public on exactly how much sweat has to go into each over indulgence of food a report of the calories burned is provided to the central database so that insurance and corporate decision makers can track usage and correlate results to use.

In one exemplary embodiment the heads-up display for visualizing calories burned as a function of real-time exercise currently uses a french fry container, with 21 animated fries, one for each 10 calories burned. The fry objects are stored in SoSwitch nodes, which are stored in one SoSeparator for indexing. The algorithm below shows how the index is computed based on calories burned and the number of calories per fry.

```
// UPDATE FRIES
int index = fmod(bike->calories, bike->fryCalories+0.1)/
(bike >fryCalories/NFRIES);
(SoSwitch*)(fries->getChild(index))->whichChild.setValue(-3);
if(index == 1 &&
(SoSwitch*)(fries->getChild(2))->whichChild.getValue( ) == 3)
for(int i = 2; i <= NFRIES; i++)
    (SoSwitch*)(fries->getChild(i))->whichChild.setValue(-1);
```

In another embodiment a banana split is illustrated wherein as the user exercises the banana split gets built item by item. In yet another embodiment, a user starts on low caloric foods (e.g. individual fries) and work up to more energy dense graphics (e.g., ice cream). It is understood that any other food item could also be used.

Software for Modeling Visual Simulations

Another aspect of interactive computer simulation enhanced exercise machine is the real time synchronization of the specific rotation sensors to the corresponding movement of the virtual character in the simulation. The software for converting sensor data to visual simulation inputs uses a unique constrained motion animation technique to display game characters as a function of real-time rotation angle.

Game characters are pre-generated using constrained motion animation in a 3D design tool. A scripting language is used to rotate vehicle components through equally spaced angle increments, saving 3D character models to file, for each angle in the sequence. For cycling, the human models are cut at the waist, and saved as sequences upper and lower body models. For rowing and handcar animations, characters are saved intact, while preserving full contact with the moving parts on the vehicle.

Game character models are stored on order, in 1-dimension containers called, e.g., Switches in Open Inventor. These sequences are treated as monotonic functions, as a function of rotation angle index. Game characters are animated by updating the Switch index, as a function of hardware rotation angle as follows:

For components that rotate 360 degrees (full revolution) the appropriate model index is identified using the following equation:

$$index = round(angle/(2*pi/(\#\_models-1)))$$

where,
 index=model index,
 round=rounding function, angle hardware rotation angle, and
_models=number of models in sequence For components that rotate through a limited range of values, like +30 to −30 degrees for handlebar motion, the appropriate model index is identified using the following equation:

$$index = (\#\_models - 1)/2 - round(angle/(max\_angle/(\#\_models - 1)))$$

where
  index=model index,
  round=rounding function,
  angle=hardware rotation angle,
  max_angle=maximum angle from side to side (i.e., 60 degrees for handlebar), and
  #_models=number of models in sequence.

For rowing, character models use rotation rates to compute an offset for the index, so rotation angles and rates are used to update the index, in the rowing simulation. In one embodiment of the rowing simulator, the rowboat simulation game character models include both rowing and feathering motions. This adds to the complexity of the index function by requiring two tables of models. In this embodiment, the oar rate is used to determine switchover conditions from rowing to feathering models, and vice versa. Accordingly, in this embodiment, there is a need to use both angles and rates in the rowing application.

Directory Structure for Auto-Configuring 3D Models

The simulation software of the system stores Open Inventor files using a unique directory structure, as seen in FIG. 14. Each application uses command-line arguments combined with a directory parameterization technique, to auto-configure 3D models specified by the user. For example, a batch file for initializing the bicycle simulation consists of the following text:

simulation DEFAULT DAY DEFAULT DAY AUSTIN MOUNTAIN RED BRUCE WHITE DEFAULT −1134.8607 −257.2762 1.138 0 1
  Where:
  "simulation"=parameter 0=application name
  DEFAULT=parameter 1=name of environment model
  DAY=parameter 2=name of light model
  DEFAULT=parameter 3=name of sky model
  DAY=parameter 4=name of sky texture file
  AUSTIN=parameter 5=name of environment (city) model
  MOUNTAIN=parameter 6=name of vehicle ("mountain bike")
  RED=parameter 7=color of vehicle
  BRUCE=parameter 8=name of game character
  WHITE=parameter 9=color of game character
  DEFAULT=parameter 10=name of apparel for game character
  −1134.8607=parameter 11=initial X-coordinate of bike
  −257.2762=parameter 12=initial y-coordinate of bike
  1.138=parameter 13=initial z-coordinate of bike
  0=parameter 14=initial yaw angle
  1=parameter 15=initial camera index The following C++ source code is used to set up custom directory search paths, using the Open Inventor SoInput::addDirectoryFirst function:

```
// SET DIRECTORIES
std::vector<string> directories;
directories.push_back(string("../../../MODELS/ENVIRONMENT/")+argv[1]);
directories.push_back(string("../../../MODELS/SKY/")+argv[3]);
directories.push_back(string("../../../TEXTURES/SKY/")+argv[4]);
directories.push_back(string("../../../MODELS/")+argv[5]);
directories.push_back(string("../../../MODELS/")+argv[5]+"/LIGHTS/"+argv[2]);
directories.push_back(string("../../../TEXTURES/")+argv[5]);
directories.push_back(string("../../../MODELS/BIKE/")+argv[6]);
directories.push_back(string("../../../TEXTURES/BIKE/")+argv[6]+"/"+argv[7]);
directories.push_back(string("../../../MODELS/BIKE/")+argv[6]+"/"+argv[8]);
directories.push_back(string("../../../TEXTURES/")+argv[8]+"/SKIN/"+argv[9]);
directories.push_back(string("../../../TEXTURES/")+argv[8]+"/APPAREL/"+argv[10]);
directories.push_back(string("../../../MODELS/HUD"));
directories.push_back(string("../../../TEXTURES/HUD"));
for(std::vector<string>::iterator i = directories.begin( ); i != directories.end( ); i++) {
    SoInput::addDirectoryFirst((*i).c_str( ));
    }
```

Generic names are used in the SoFile statements in the master scene graph, such as "world.iv", "bike.iv", sky.iv, etc., while the same names are used in the subdirectories specified by the user, but with unique models stored in the files. Therefore, the user can custom-configure the bike simulation using batch files with 16 command line inputs, as seen above. This same technique is used in the boat and handcar simulations.

Since game characters are constrained to a vehicle, they are preferably stored in a subdirectory of the corresponding vehicle. Additionally, since lights are specific to a given environment, they are preferably stored in a subdirectory under the corresponding environment model. The directory structure also makes use of generic names for parent directories, with more specific names used in the child directory names, e.g., BIKE vs. MOUNTAIN (bike).

Scene Graph for Structuring and Configuring Visual Simulations

A scene-graph is an object-oriented structure that arranges the logical and often (but not necessarily) spatial representation of a graphical scene. Scene-graphs are a collection of nodes in a graph or tree structure. This means that a node may have many children but often only a single parent, the effect of a parent is apparent to all its child nodes—An operation applied to a group automatically propagates its effect to all of its members. In many programs, associating a geometric transformation matrix (see also transformation and matrix) at each group level and concatenating such matrices together is an efficient and naturally to process such operations. A common feature, for instance, is the ability to group related shapes/objects into a compound object which can then be moved, transformed, selected, etc. as easily as a single object.

Referring to FIG. 11A, the exemplary scene graph of the present disclosure is uniquely designed to combine relative and absolute motion of simulated objects, allowing the use of native physics-based reference frames as well as Open Inventor—specific frames for greater efficiency and ease of use. The present disclosure uses a scene graph design supporting custom motion hierarchies with direct support for physics-based transformation chains, including subgraphs for heads-up displays, environments, vehicles, and game characters, as seen in FIG. 11A. Five reference frames are defined in the simulation as follows: a world frame which is the inertial reference frame used in Open Inventor; a glob frame which is the inertial reference frame used in physics model; a body frame which is the reference frame attached to center of mass of each vehicle in physics model; a structural frame which is the reference frame attached to a geometrically fixed point on each object in the physics model; and an object frame which is the reference frame attached to a geometrically fixed point on each object in Open Inventor.

The scene graph of the present invention consists of a tree of nodes (scene objects) and property nodes that affect the render state. Transform nodes are used to translate, scale, and rotate 3D shapes, such as vehicle models, in world coordinates. Transformation chains can be defined, to transform from object to world coordinates, via several intermediate frames, as the scene graph is traversed from top-down, and left-to-right. Transforms define coordinate transformations between frames, so the scene graph can be organized to allow the user to work with physics-based coordinates, i.e. global or body frames, without having to convert simulation state data to world coordinates.

Transforms can be used to transform local coordinates within branches of the scene graph, allowing state data to be defined in the local frame. The following transforms are defined in the master scene graph, several of which are physics-based, as follows:

[Camera->World]=Camera to World transformation;
[World->Global]=World to Global transformation (Inventor-to-physics);
[Global->Body]=Global to Body transformation (physics-based);
[Body->Structural]=Body to Structural transformation (physics-based);
[Structural->Object]=Structural to Object frame transformation (physics-to-Inventor); and
[Structural->Structural2]=vehicle Structural to Camera Structural "Structural2" transformation.

Cameras are located at the top of the scene, to provide visibility to aobjects, requiring them to be updated via the [World->Structural2] transform. The simulation updates the global-to-body transform with the vehicle's position and orientation, which transforms anodes below it when the scene is rendered (i.e., when the scene is rendered). The simulation also updates transforms within the vehicle subgraphs, used to rotate and translate movable parts relative to the vehicle. (in object coordinates). Relative motion occurs below the structural-to-object node, while absolute motion occurs above it. Transforms define coordinate transformations between frames.

The game character (human) models are stored within a unique subgraph consisting of a Switch node with #_models human models stored within the switch (subtree). The switch index is set by the simulation to point to the character model that matches the state of the vehicle component to which it is attached. The movable vehicle components are rotated separately via embedded transform nodes within the vehicle subgraph, to match up with the game characters that rotate to meet the components to which they are attached.

Referring to FIG. 11A, the environment model, world.iv (i.e., city, lake, etc.) is stored in world coordinates, and hence, does not require a transformation. However, the game character and vehicle models are transformed from object to world coordinates before being rendered, via the following:

[Global->World]*[Body->Global]*[Structural->Body]
*[Object->Structural]

Relative transformations can be performed within the vehicle subgraph, i.e., [Object->Object-Prime] while game characters are always displayed in object coordinates, and transformed to the world frame via the above equation.

The user can also insert visual effects such as trajectory curves under the GLOBALTOBODY transform, with points stored in global coordinates, for efficiency.

By way of example of the above discussed transformations, exemplary transformation equations for the bike model are provided. The equation for the position vector of the object reference frame origin (that moves with the bike) with respect to the world frame is given by:

$$r(O|W)=r(G|W)+[G\text{->}W] \times r(B|G)+[B\text{->}W] \times r(S|B)+[S\text{->}W] \times r(O|S)$$

Where,
r(O|W)=position vector of Object frame origin in World Coordinates
r(G|W)=position vector of Global frame origin in World Coordinates
r(B|G)=position vector of Body frame origin in Global Coordinates
r(S|B)=position vector of Structural frame origin in Body Coordinates
r(O|S)=position vector of Object frame origin in Structural Coordinates
[G->W]=Global to World rotation matrix
[B->W]=[G->W]=[B->G]=Body to World rotation matrix, and
[B->G]=Body to Global rotation matrix
[S->W]=[G->W]×[B->G]×[S->B]=Structural to World rotation matrix, and
[S->B]=Structural to Body rotation matrix The bike scene graph requires the following translation vectors and rotation matrices: (i.e., to set the SoTransform states within the scene graph)

point1=[0.0000, 0.9779, 0.5038]
point2=[0.0000, 0.8547, 0.4662]
point3=[0.0000, 0.6201, 0.5149]
point4=[0.0000, 0.2822, 0.6565]
point5=[0.0000, 0.2729, −0.0155]
point6=[0.0000, 0.2822, −0.4321]

*World to Global Transformation*

$$[\text{World} \to \text{Global}] = \begin{vmatrix} 0 & 0 & -1 \\ -1 & 0 & 0 \\ 0 & 1 & 0 \end{vmatrix}$$

r(G | W) = [0, 0, 0](World and Global frames are collocated)

*Global to Body Transformation*

$$[\text{Global} \rightarrow \text{Body}] = \begin{vmatrix} \cos(yaw) & \sin(yaw) & 0 \\ -\sin(yaw) & \cos(yaw) & 0 \\ 0 & 0 & 1 \end{vmatrix}$$

$$r(B \mid G) = [X, Y, 0],$$

Where r(B|G) is the bike's propagated state vector (i.e., X/Y location of center of mass in Global coordinates)
*Body to Structural Transformation*

$$[\text{Body} \rightarrow \text{Structural}] = \begin{vmatrix} 1 & 0 & 0 \\ 0 & 1 & 0 \\ 0 & 0 & 1 \end{vmatrix}$$

$$r(S \mid B) = [0, 0, -0.8701]$$

*Structural to Object Transformation*

$$[\text{Structural} \rightarrow \text{Object}] = \begin{vmatrix} 0 & 1 & 0 \\ 0 & 0 & 1 \\ 1 & 0 & 0 \end{vmatrix}$$

$$r(O \mid S) = [0.0155, 0, -0.2729]$$

In this exemplary embodiment, the center of mass (COM) was found to be 0.8701 meters above point #5, and located on the vertical line through point 5. The COM is also located 45 inches above ground level, which is 1.143 meters.

Software for Simulating Moving Cameras

The visualization software of the interactive computer simulation enhanced exercise machine uses a unique algorithm for translating and rotating cameras, based on the transformation chain that is defined by the following equation:
 [Structural->Structural2]*[Body->Structural]*[Global->Body]*[World->Global]*[Camera->World]
 Where,
 [Camera->World]=Camera to World transformation,
 [World->Global]=World to Global transformation,
 [Global->Body]=Global to Body transformation,
 [Body->Structural]=Body to Structural transformation, and
 [Structural->Structural2]=vehicle Structural to Camera Structural"Structural2" transformation, where Structural2 represents the camera's state relative to the vehicle.

This algorithm converts Structural2 to default camera coordinates, which properly orients the camera in world space.

The [Structural->Structural2] transform is located in the scene graph using the SoSearchAction class. The SoSearchAction class is used to search scene graphs for specific nodes, nodes of a specific class, nodes with a specific name, or any combination of these. It can search for just the first or last node satisfying the criteria or for all such nodes. The actions return paths to each node found. Here SoSearchAction locates the [Structural->Structural2] transform, which provides the path to the tail node used to compute the [World->Structural2] transformation. (See FIG. 11B).

The Open Inventor SoGetMatrixAction class is an action for accumulating the transformation matrix of a subgraph. This action makes it easy to calculate and convert to and from the global coordinate system of your scene and local coordinates of parts in a hierarchical model. The simulator visualization software uses SoGetMatrixAction to compute the [World->Structural2] transform for each simulation cycle, which is used to set the camera's position and orientation.

Since the camera nodes have the [Camera->World] transform located above them in the scene graph, the cameras are transformed correctly when the scene is rendered, by combining [Camera->World] with the camera's updated state in world coordinates.

This algorithm is particularly unique, due to the fact that the [Global->Body] node associated with the vehicle is updated via the simulation, and used to compute the [World->Structural2] transformation for each cycle.

In this way, the cameras move with the vehicle without having to explicitly compute their states—just find the path to [Structural->Structural2], and use SoGetMatrixAction to compute [World->Structural2], based on the embedded [Global->Body] node within the search path. (i.e., the [Global->Body] node moves the camera over time, via the motion hierarchy shown in FIG. 11B).

Bicycle Simulation Software

Figure 16A:
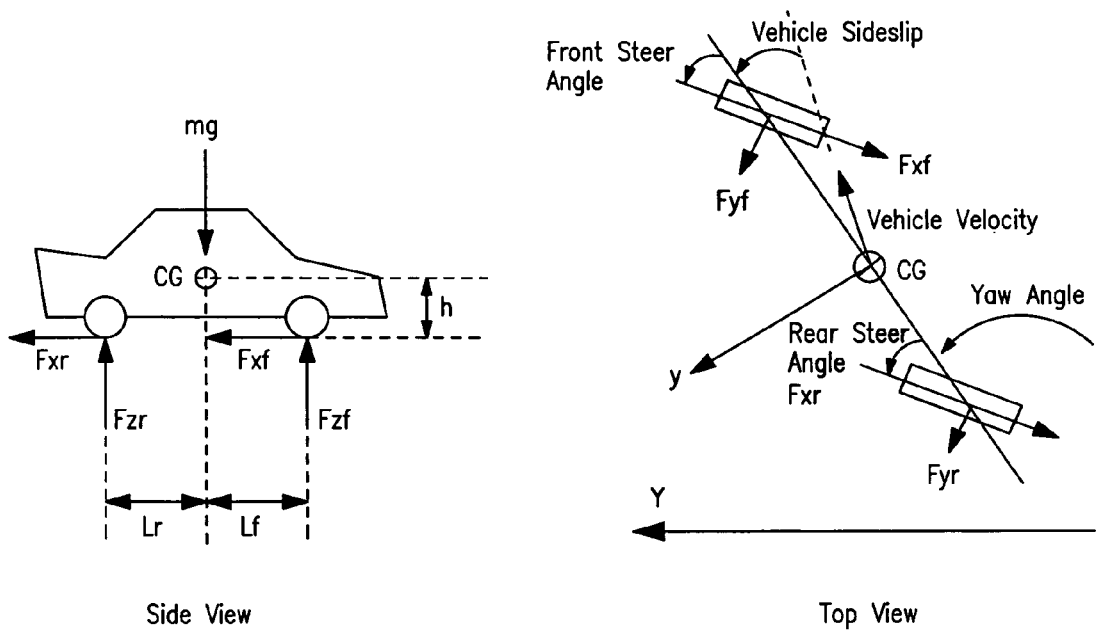
FIG. 16A is a free body diagram of a vehicle.
Figure 16B:
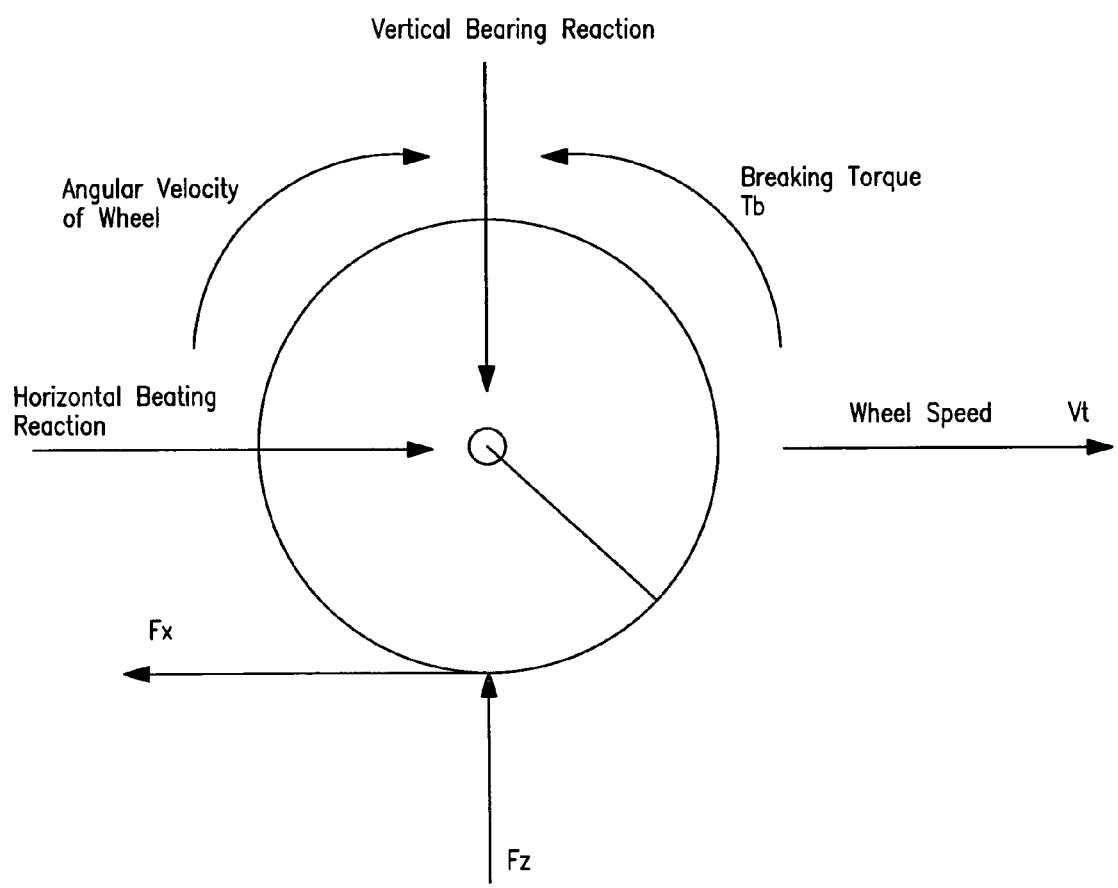
FIG. 16B is a free body diagram of a wheel.

An exemplary screen shot of a bicycle simulation is shown in FIG. 3A. The disclosed bike simulator propagates the bike using a 5-degree of freedom high fidelity bicycle model, as shown in FIGS. 16A and 16B. The tire force terms enter into Equations 1, 2, and 3 (below), for longitudinal and lateral motion, as well as rotational (yaw) motion, about the vertical axis.

$$-F_{xf}\cos\delta_f - F_{yf}\sin\delta_f - F_{xr}\cos\delta_r - F_{yr}\sin\delta_r = m(\dot{v}_x v_y r) \quad (1)$$

$$F_{xf}\cos\delta_f - F_{yf}\sin\delta_f + F_{yr}\cos\delta_r - F_{xr}\sin\delta_r + m(\dot{v}_y v_x r) \quad (2)$$

$$L_f(F\cos\delta f - F_{xf}\sin\delta_f) - L_r(F_{yr\,l\cos\,\delta r} - F_{xr}\sin\delta_r) = I_z \dot{r} \quad (3)$$

Figure 10:
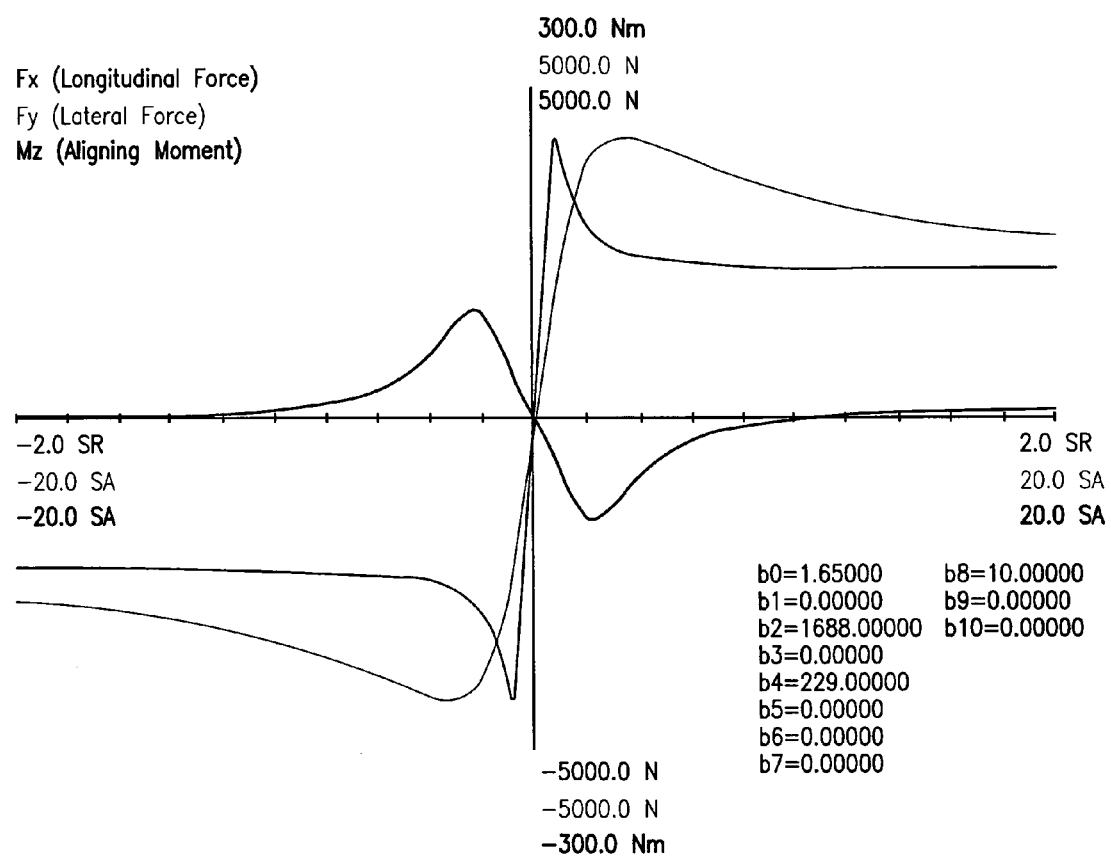
FIG. 10 is a Pacejka model with coefficients for a race car tire

The tire forces including lateral components are non-trivial, requiring sophisticated empirical models based on test lab data, such as Pacejka's formula shown in FIG. 10. There are no published Pacejka coefficients for bicycle tires. Accordingly, a mountain bike with a 200-pound rider was used to approximate the function, based on performance tests utilizing geometric constraints in a parking lot.

This function used in the disclosed system is similar to the high fidelity Pacejka version, although it uses a linear approximation, with constant fmax values past the threshold values of +/−28 degrees sideslip angle, as seen below:

```
double Fy;
if(slipAngle > limit)
    Fy = fmax;
else if(slipAngle < -limit)
    Fy = -fmax;
else
    Fy = slipAngle*fmax/limit;
double speed = velocity.length( );
if(speed <= 0.7) Fy *= speed/0.7;
return Fy;
```

The Pacejka-like function used in the present system has a max value of 12 pounds, which was determined to work well for a 200-pound cyclist on a standard mountain bike, with a threshold sideslip angle of 28 degrees. This algorithm also scales the force by the speed/0.7 for low-speed motion, which fixes an instability in the model.

The bike simulator also monitors an instability that occurs when the vehicle speed goes negative and/or if the yaw rate changes sign, indicating a zero crossing, i.e., if a root occurs in yaw rate:

```
if(velocity[0] < 0.0 | | velocity.length( ) <= 0.3 &&
oldYawRate*yawRate < 0.0) {
    yaw = oldYaw;
    stopHere(oldPosition);
}
```

In this case, the bike is stopped and yaw is set to zero, while waiting for the next user input to propel or steer the bike from rest. The complete bicycle propagation algorithm is shown in FIGS. 15A and 15B.

Rail Vehicle Simulation Software

An exemplary screen shot of a rail vehicle simulation is shown in FIG. 3C. The rail vehicle propagator is a constrained motion algorithm that models curvilinear motion along a railroad track, as seen in the FIG. 13A. The algorithm uses a path-following scheme to fit the vehicle to the track, defined by the centerline curve. The vehicle is first propagated in a straight line based on the previous state vector, over the current simulation step. (curvilinear motion). Then the simulated distance traveled is used to determine the constrained location on the Structural frame origin on the railroad track, measured from the previous position vector.

Figure 13D:
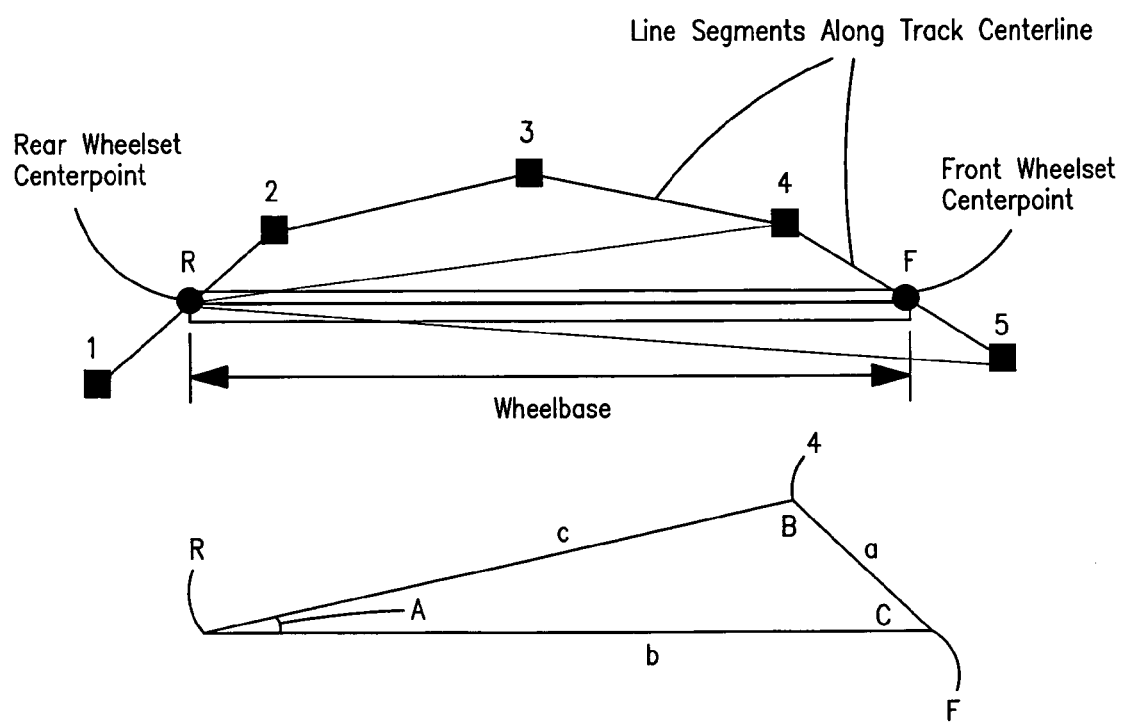
FIG. 13D is the rail vehicle propagation algorithm geometry.

The vehicle's structural frame is then propagated along the length of the curve, from the starting point through the distance traveled. After the vehicle's rear reference point is propagated to lie on the constraining curve, the vehicle is rotated into place, using kinematics and trigonometry, as shown in FIG. 13D. The final step is to rotate the vehicle's wheelsets into place, such that the wheels align with the local track geometry.

The complete algorithm is shown in FIGS. 13B and 13C. This algorithm uniquely propagates the rail vehicle in body coordinates, along the vehicle's initial X body axis, then fits it (geometrically) to the track, based on the distance traveled, and kinematical constraints. The fitting algorithm is unique, using a track point sequence that bounds the vehicle, using "Length of Curve Theory" from calculus. Once points R and F are bounded, the triangle geometry shown above is used, to locate point F—used to align the vehicle along vector RF. Once the alignment matrix is computed, the vehicle's global-to-body matrix (transform) is updated, using the new global-to-structural matrix, as follows:

Global-to-Body=[Structural-to-Body]*[Global-to-Structural]

The track's curvature, "super elevation", and grade can be used to increase friction and rolling moments in the vehicle propagation, to account for increased friction around curves, as well as possible derailment events, etc. Therefore, this algorithm can be tweaked for high fidelity simulation, while preserving real-time performance. Also note that the full-blown equations of motion for rail vehicles with constrained motion requires a complex, numerically expensive solution, which is not well-suited for real-time.

The rail vehicle propagator provides forward and backward motion, and the vehicle motion can be switched instantly via left/right key press events. The algorithm uses a unique circular_bounds index increment algorithm, that works on the "circular list" of track points. The resulting vehicle motion is considered "Curvilinear" using this algorithm. The rail vehicle wheelsets can also be rotated to align with the track, based on local tangency vectors, computed based on local bounding points near the wheel axle.

Railroad Design Process, to Accommodate Rail Vehicle Simulation

The unique rail vehicle propagator requires a pre-defined curve, defined along an arbitrarily complex railroad track. This track may include grades, super elevation, complex curvature, (i.e., for roller coaster applications) etc. The centerline curve consists of a tabulated function in 3D space, which runs along the track centerline. Straight line segments are represented using two points on the ends, while curved segments require large sets of points, in a point-to-point curvature fashion. (see Length of Curve Theory from calculus)

The track curve is defined in global coordinates, i.e., with respect to the global reference frame defined in the physics model. A special curve-generating program is used to generate the point sequences in global coordinates, then transformed to Open Inventor world coordinates, before storing them in an SoCoordinate node, used to define an SoLineSet curve. The program saves the SoLineSet to an Open Inventor file, which is exported to a 3D modeling tool, like Maya, Lightwave, 3DS Max, etc.

The track curve is imported into the 3D modeling tool, where "extrusion" is used to generate the track, with the centerline following the curve (point sequence) in a precise mathematical way. The extruded track model is then saved in Open Inventor format, and used in the handcar simulator, via the Open Inventor database read function. To create the railroad track, the shape can be imported into 3ds max and the "Loft" tool can be used to extrude the railroad track along a path." Also note that this propagation algorithm can be used on an any track, including complex roller coasters, with spirals, loops, hills, etc. In other embodiments, a mini-roller coaster game with power augmentation, similar to the old Mini-Mine Train ride at Six Flags over Texas, may be simulated.

The track is typically designed in a 3D modeling to relative to an existing environment (terrain) model. The centerline points and unit normals are exported to a text file, and used to create Open Inventor curves, which are saved in separate files to be imported into another tool for lofting. The track is lofted based on the centerline curve with unit normals, to specify twisting, and the track is exported to Open Inventor for use in the simulation. The centerline points and normals are also converted to Global coordinates and stored in a separate text file, to be used in the rail vehicle propagation algorithm. Complete railroads can be assembled in the 3D modeling tool using these segment models.

Network Connectivity and Multiplayer Mode

In another embodiment of the computer simulation enhanced exercise machine, the simulations can be run in single or multi-player mode, over a local network or the Internet. Users can join a game, with different vehicles interacting within the same environment. Coworkers can compete against each other, in teams, or against other groups/companies, via the Internet. The simulations may involve complex games with game AI and sophisticated scenarios.

In yet another embodiment, each user's activity is stored in a local database, which is accessible for analysis. (e.g., company-wide data can be compiled for health and wellness programs, health insurance requirements, etc.). The database also provides useful information to the user, such as calories burned, diet plan, and exercise progress.

In yet other embodiments, the system includes a chat line on the screen that lets users chat as they play and may further include video and audio transmission either live or reanimated signature video clips depending on the user's personality and alter ego. Other embodiments may further include tournaments and race meets scheduled though a central computer. The system may also be adapted to download new game features at various time intervals so the game play does get stale. In yet another embodiment, advertisements may be integrated into the simulation. Further embodiments may display advertisements based on user data, such as, demographics, caloric burn rate, or type of exercise preferred. The advertisement, for example, may include neighborhood restaurants and food delivery services that produce healthy food delivered. In yet another embodiment, users may collect points for game play for use at these select (pay to join) business establishments.

Other and additional features of the present invention are demonstrated by the following additional exemplary embodiments of the invention.

A resistive device, comprising: a housing open on two ends and forming an internal void region; a first end plate attached for one open end of the housing; a second end plate having a transverse bore and a central bore and being attached to the other open end of the housing, wherein said transverse bore opens into the internal void region; a paddle assembly comprising a paddle portion disposed in the internal void region and a main shaft portion extending from the paddle portion through the central bore in the second end plate; a rod shaped valve rotateably disposed in said transverse bore and having an axially extending cut out region aligned with the portion of the transverse bore opened to the internal void region, said valve being rotateable between a closed position when said cut out region is not exposed to the internal void region and an variable position when at least a portion of said cut out region is exposed to the internal void region.

A mechanical rotational motion sensor assembly, comprising: a sensor wheel coded with equally spaced slots around the perimeter at a first radial distance from the center of the wheel and wherein said slots permit light to pass through the wheel and wherein said sensor wheel is adapted to engage the moving part of an exercise device; an optical source disposed on one side of the sensor wheel at approximately said first radial distance from the center of the wheel; an optical detector disposed on the other side of the sensor wheat approximately said first radial distance from the center of the wheel; code for detecting the number of sensor wheel slots that pass between the optical source and optical detector in a period of time; and code for converting the number of sensor wheel slots that pass between the optical source and optical detector in a period of time to least one of a rotation in degrees or radian, or a rotation rate in degrees per second or radians per second.

A virtual reality simulator, comprising: code for receiving motion data from at least one sensor associated with an exercise device; code for converting said motion data to a rotation rate; code for associating said motion data with a physical position of a moveable part of an exercise device related to a user's movements on the exercise device; code for associating said physical position with a corresponding visual model; code for structuring and configuring visual simulations; code for simulating moving cameras; rail vehicle simulation software; and railroad design process to accommodate rail vehicle simulation.

An interactive real-time simulator, comprising: a mechanic sensor for data acquisition; code for modeling physic simulations; code for modeling visual simulations; and code for managing multiplayer networked simulations and games.

Mechanical sensors for data acquisition, comprising: mouse sensors with CPNMouse software for tracking, including wireless connectivity; real-time cycling, providing rotation angles, rates, and button events, and force-feedback; and code for managing multiple mice, database lookups, adaptive configurations, and reset functionality.

Software for modeling physic simulations, comprising: code for updating physic simulations; rail vehicle simulation software; and bicycle simulation software.

Software for modeling visual simulations, comprising: code for updating visual simulations; code for structuring visual simulations; code for simulating moving cameras; code for visualizing calories burned as a function of real-time exercise; and railroad model design process to accommodate rail vehicle simulation.

Software for managing multiplayer networked simulations and games structuring and configuring visual simulations.

Software for modeling physic simulations, comprising: algorithms for modeling force, torque, and caloric rate, as a function of crank rate and resistance; calibration tests to determine max crank rate at graduated resistance levels; and algorithms for limiting rotation angles, based on range reduction, geometric constraints, and rotation rates.

Rail vehicle simulation software, comprising: vehicle propagation algorithm based on curvilinear dynamics and path following; vehicle steering algorithm using kinematic constraints and trigonometry; and wheelset alignment algorithm using kinematic constraints, Bicycle simulation software, comprising: vehicle steering algorithm using modified Pacejka formula for bicycle tires, with singularity monitoring based on velocity and sign change in yaw rate; and modeling gear shift events via software control of the servomotor that controls oil pump resistance.

Software for modeling visual simulations, comprising: table-based animation of game characters, for full revolution and limited range motion.

Software for structuring visual simulations, comprising: support for interchangeable 3D models, using generic file names and directory parameterization of model names; and custom motion hierarchies with direct support for physics-based transformation chains, including subgraphs for heads-up displays, environments, vehicles, and game characters.

Software for simulating moving cameras, comprising: support for translating and rigidly fixed cameras, via custom transformation chains linked to the vehicle Structural frame; and multiple active cameras with bidirectional toggling.

A railroad model design process to accommodate rail vehicle simulation, comprising: track model extrusion, based on centerline curves, with unit normals for twisting; track layout design relative to virtual environment in 3D modeling tool, exporting centerline curves with unit normals; fitting existing track segments together on the terrain surface, forming complete track models; with centerline curve extraction for simulation; and software for generating centerline curves and unit normals, based on track shape requirements.

It will be understood to one of ordinary skill in the art that the foregoing software may be stored on a computer readable medium to be read by and executed by a computer or other microprocessor based device.

It should be understood that the descriptions of the computer simulation enhanced exercise machine as described herein (including the figures) is only representative of some illustrative embodiments. For the convenience of the reader, the above description has focused on a representative sample of a possible embodiments, a sample that teaches the principles of the invention. The description has not attempted to exhaustively enumerate a possible variations. That alternate embodiments may not have been presented for a specific portion of the invention, or that further undescribed alternate embodiments may be available for a portion, is not to be considered a disclaimer of those alternate embodiments. One of ordinary skill will appreciate that many of those undescribed embodiments incorporate the same principles of the invention as claimed and others are equivalent.

What is claimed is:

1. An interactive computer simulation enhanced exercise device, the device comprising:
  a pair of rowing lever arms adapted to attach to a desk surface within an under-desk leg space of a desk, each of the pair of rowing lever arms comprising a first end attachable to a desk surface by a horizontal pivotable means and a second end having a handle aligned in a proximal parallel alignment with a front of a desk, the handles adapted to be grasped like oars of a boat and pulled toward a user pivoting the rowing lever arms horizontally in a movement simulating rowing a boat with oars in oarlocks;
  a pivot resistance means attachable between each of the pair of rowing lever arms and the desk surface to create a resistance to pivoting the pair of rowing lever arms for the purpose of exercising by pulling to pivot the pair of rowing lever arms horizontally;
  a rotational motion sensor having a first portion and a second portion, the first portion being stationary with respect to the desk surface and the second portion being attached to the rower lever arms so that the second portion rotates with respect to the first portion when the rowing levers are pulled toward the user;
  a microprocessor device having a computer-readable storage medium containing a set of instructions executable by the microprocessor device, the set of instructions comprising;
  code for receiving motion data from the rotational motion sensor associated with the pair of rowing arms;
  code for converting the motion data to a degree of rotation and a rotation rate;
  code for associating said motion data with a physical position of the rowing lever arms related to a user's movement of the pair of rowing arms;
  code for associating said physical position with a corresponding visual model; and
  code for simulating moving cameras.

* * * * *